United States Patent
Kusachi et al.

(10) Patent No.: US 10,511,004 B2
(45) Date of Patent: Dec. 17, 2019

(54) NON-AQUEOUS ELECTROLYTE SECONDARY BATTERY

(71) Applicant: Nissan Motor Co., Ltd., Yokohama-Shi, Kanagawa (JP)

(72) Inventors: Yuki Kusachi, Kanagawa (JP); Yasuhiko Ohsawa, Kanagawa (JP); Hiroshi Akama, Kanagawa (JP); Hideaki Horie, Kanagawa (JP); Yuta Murakami, Kyoto (JP); Kenichi Kawakita, Kyoto (JP); Yusuke Mizuno, Kyoto (JP); Yasuhiro Tsudo, Kyoto (JP); Yasuhiro Shindo, Kyoto (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 15/117,068

(22) PCT Filed: Jan. 26, 2015

(86) PCT No.: PCT/JP2015/052074
§ 371 (c)(1),
(2) Date: Aug. 5, 2016

(87) PCT Pub. No.: WO2015/118988
PCT Pub. Date: Aug. 13, 2015

(65) Prior Publication Data
US 2016/0351877 A1    Dec. 1, 2016

(30) Foreign Application Priority Data
Feb. 6, 2014  (JP) ................................ 2014-021356

(51) Int. Cl.
*H01M 2/16*    (2006.01)
*H01M 10/052*  (2010.01)
(Continued)

(52) U.S. Cl.
CPC ......... *H01M 2/1673* (2013.01); *H01M 4/366* (2013.01); *H01M 4/62* (2013.01);
(Continued)

(58) Field of Classification Search
CPC ........... H01M 10/052; H01M 10/0525; H01M 2300/0025; H01M 2300/0085;
(Continued)

(56) References Cited

U.S. PATENT DOCUMENTS 6,004,583 A  * 12/1999  Plate ...................... A61K 47/32
                                                           424/486
6,509,123 B1    1/2003  Shibuya et al.
(Continued)

FOREIGN PATENT DOCUMENTS

EP        3057158 A1    8/2016
JP     2005149893 A    6/2005
(Continued)

OTHER PUBLICATIONS

Battery Handbook, edited by the Electrochemical Society of Japan, The Committee of Battery Technology, 2010, pp. 523-546.

*Primary Examiner* — Stewart A Fraser
*Assistant Examiner* — Victoria H Lynch
(74) *Attorney, Agent, or Firm* — Young Basile Hanlon & MacFarlane, P.C.

(57) ABSTRACT

A non-aqueous electrolyte secondary battery has a positive electrode having a positive electrode active material layer, a negative electrode having a negative electrode active material layer, and an electrolyte layer having an electrolyte solution containing a non-aqueous solvent. At least one of the positive electrode active material layer and the negative electrode active material layer contains an electrode material for a non-aqueous electrolyte secondary battery having a core part including an electrode active material and a shell
(Continued)

part including a conductive material in a base material formed by a gel-forming polymer having a liquid absorption rate with respect to the electrolyte solution of 10 to 200%.

10 Claims, 4 Drawing Sheets

(51) Int. Cl.
*H01M 4/62* (2006.01)
*H01M 4/36* (2006.01)
*H01M 10/0525* (2010.01)

(52) U.S. Cl.
CPC ........... *H01M 4/622* (2013.01); *H01M 4/625* (2013.01); *H01M 10/052* (2013.01); *H01M 10/0525* (2013.01); *H01M 2300/0025* (2013.01); *H01M 2300/0085* (2013.01); *Y02T 10/7011* (2013.01)

(58) Field of Classification Search
CPC ...... H01M 2/1673; H01M 4/366; H01M 4/62; H01M 4/622; H01M 4/625
See application file for complete search history.

(56) References Cited

U.S. PATENT DOCUMENTS

| | | | |
|---|---|---|---|
| 2005/0118508 A1* | 6/2005 | Yong | H01M 2/1673 429/246 |
| 2008/0032192 A1 | 2/2008 | Yokomizo et al. | |
| 2009/0042099 A1 | 2/2009 | Tatematsu et al. | |
| 2014/0023922 A1 | 1/2014 | Isshiki et al. | |
| 2014/0079995 A1 | 3/2014 | Wakada | |
| 2014/0248534 A1 | 9/2014 | Chikugo et al. | |
| 2015/0050544 A1* | 2/2015 | Nam | H01M 2/1686 429/145 |
| 2016/0248086 A1 | 8/2016 | Ohsawa et al. | |

FOREIGN PATENT DOCUMENTS

| | | |
|---|---|---|
| JP | 2007042285 A | 2/2007 |
| JP | 2007207510 A | 8/2007 |
| WO | 2012099264 A1 | 7/2012 |
| WO | 2012165422 A1 | 12/2012 |
| WO | 2013069280 A1 | 5/2013 |

* cited by examiner

FIG.4( a )
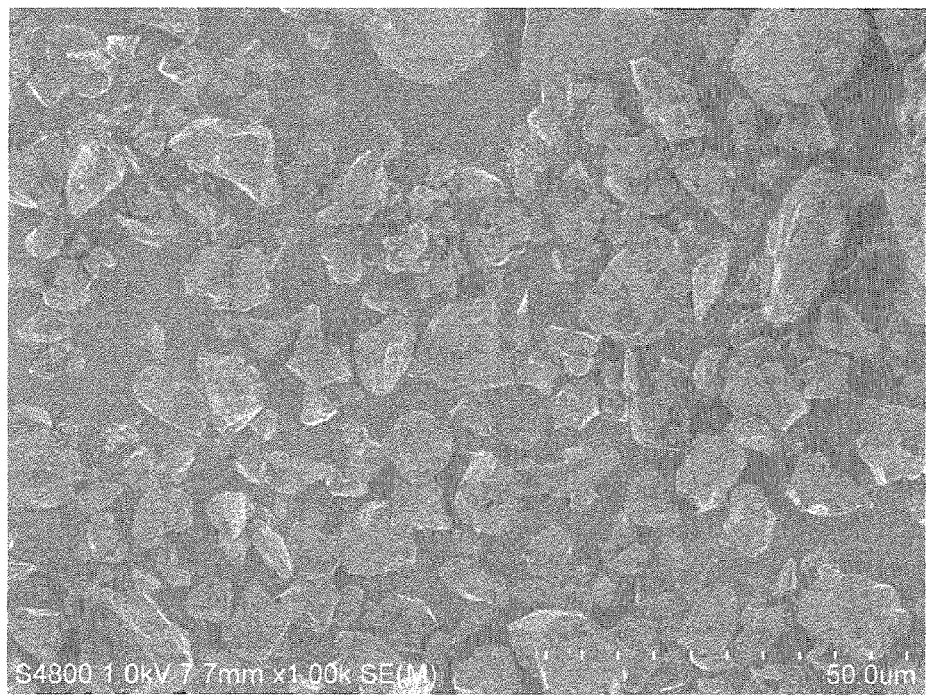
FIG.4( b )
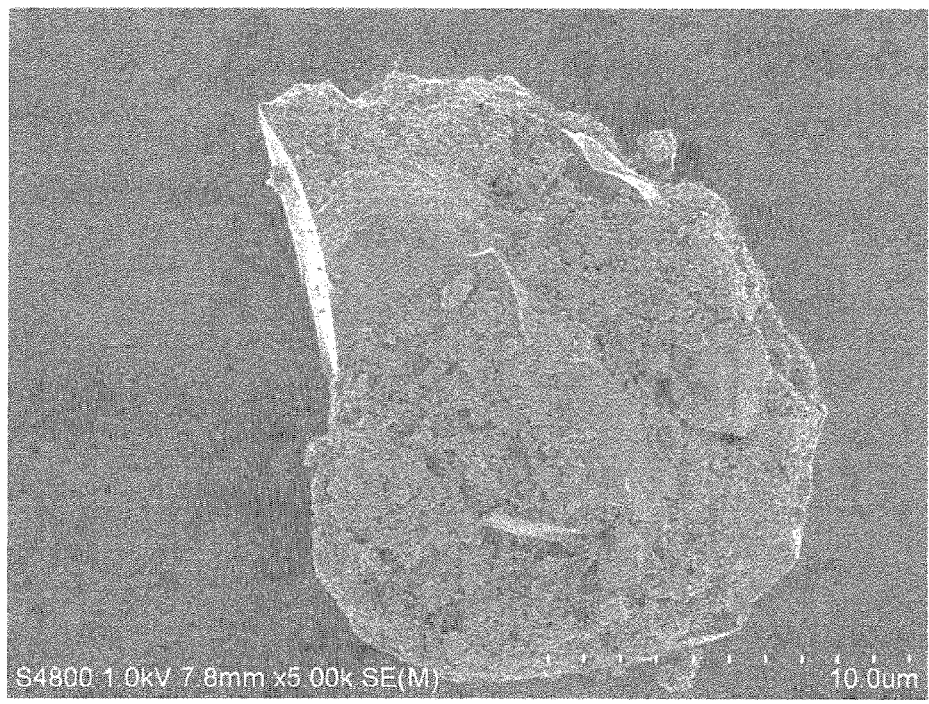

NON-AQUEOUS ELECTROLYTE SECONDARY BATTERY

CROSS REFERENCE TO RELATED APPLICATION

The entire contents of the Japanese Patent Application No. 2014-021356, filed on Feb. 6, 2014, in which the priority right of the present patent application is claimed, is herein incorporated by reference.

TECHNICAL FIELD

The present invention relates to a non-aqueous electrolyte secondary battery.

BACKGROUND

A non-aqueous electrolyte secondary battery such as a lithium ion secondary battery has been widely used as a power source for mobile device, due to its high energy density, high durability, charge and discharge efficiency, and the like. In recent years, uses as a power source for large-scaled system such as electric motor vehicles such as a hybrid electric vehicle (HEV), an electric vehicle (EV), and a fuel cell vehicle and stationary storage system have been expanded. As a battery used for these power sources, increase in the size of battery, further increase in energy density, high production efficiency for economically achieving these battery performances, and improvement in battery properties accompanying them are required.

The non-aqueous electrolyte secondary battery generally has a configuration in which a positive electrode having a positive electrode active material or the like applied on a current collector and a negative electrode having a negative electrode active material or the like applied on a current collector are connected to each other via an electrolyte layer in which a non-aqueous electrolyte solution or a non-aqueous electrolyte gel is retained within a separator. Charge and discharge reactions of a battery occur by absorption and desorption of ions such as lithium ions on electrode active materials.

One of problems for improving battery properties includes stabilization of the interface between an active material and a non-aqueous electrolyte solution or non-aqueous electrolyte gel. For example, it is known that a solvent, a supporting salt and also an intentionally added additive are decomposed on the electrode surface at an initial charge of lithium ion secondary battery using an electrolyte solution, so that the decomposition product functions as a protective coating film that suppresses a new decomposition of electrolyte (Battery Handbook, edited by The Electrochemical Society of Japan, The Committee of Battery Technology, p. 523 to 546 (2010) ("Battery Handbook")). This protective coating film is called as solid electrolyte layer (SEI), and is known to greatly contribute to cycle performance, storage performance, charge and discharge efficiency and safety of a battery.

On the other hand, since a non-aqueous electrolyte secondary battery uses a combustible liquid in the electrolyte solution in many cases, a technology for safety improvement is always required, and a battery using an electrolyte that is made into a gel electrolyte so as not to leak is known. U.S. Pat. No. 6,509,123 discloses a battery using a gel electrolyte obtained by forming a copolymer in which hexafluoropropylene is copolymerized with polyvinylidene fluoride (PVdF-HFP) into a gel matrix and swelling it with the electrolyte solution added with vinylene carbonate as an additive. By using such gel electrolyte, chemical stability with the electrode is improved, and the initial charge and discharge efficiency and capacity are improved.

However, when the present inventors have studied, it has been found that, there is a problem in the conventional technology, for forming an electrochemically stabilized electrode active material/electrolyte interface and increasing the energy density of a battery. Specifically, the technology of Battery Handbook is a technology for adding an additive to an electrolyte solution, and proactively forming a decomposition coating film on the interface using an electrochemical reaction, thus a quantity of electricity is necessary for continuing the reaction. Therefore, the coulomb efficiency of the battery is consequently lowered, and becomes the cause of battery capacity reduction.

On the other hand, in the technology described in U.S. Pat. No. 6,509,123, since it goes through a step of infiltrating a gel electrolyte into an electrode active material layer, it is difficult to obtain good adhesion between an active material and the gel electrolyte, thus there is a problem in controlling an electrode active material/electrolyte interface.

SUMMARY

Therefore, an object of the present invention is to provide a non-aqueous electrolyte secondary battery that can improve the energy density of a battery.

Solution to Problem

In order to achieve the above object, according to one embodiment of the present invention, there is provided a non-aqueous electrolyte secondary battery comprising a positive electrode having a positive electrode active material layer, a negative electrode having a negative electrode active material layer, and an electrolyte layer having an electrolyte solution containing a non-aqueous solvent, wherein at least one of the positive electrode active material layer and the negative electrode active material layer contains an electrode material for a non-aqueous electrolyte secondary battery having a core part including an electrode active material and a shell part including a conductive material in a base material formed by a gel-forming polymer having a liquid absorption rate with respect to the electrolyte solution of 10 to 200%.

BRIEF DESCRIPTION OF THE DRAWINGS

FIG. 4 is scanning electron microscope (SEM) photographs ((a) magnification of 1,000 times, (b) magnification of 5,000 times) of the core-shell-type electrode material (negative electrode material) obtained in Production Example 1

DESCRIPTION OF THE EMBODIMENTS

Figure 1:
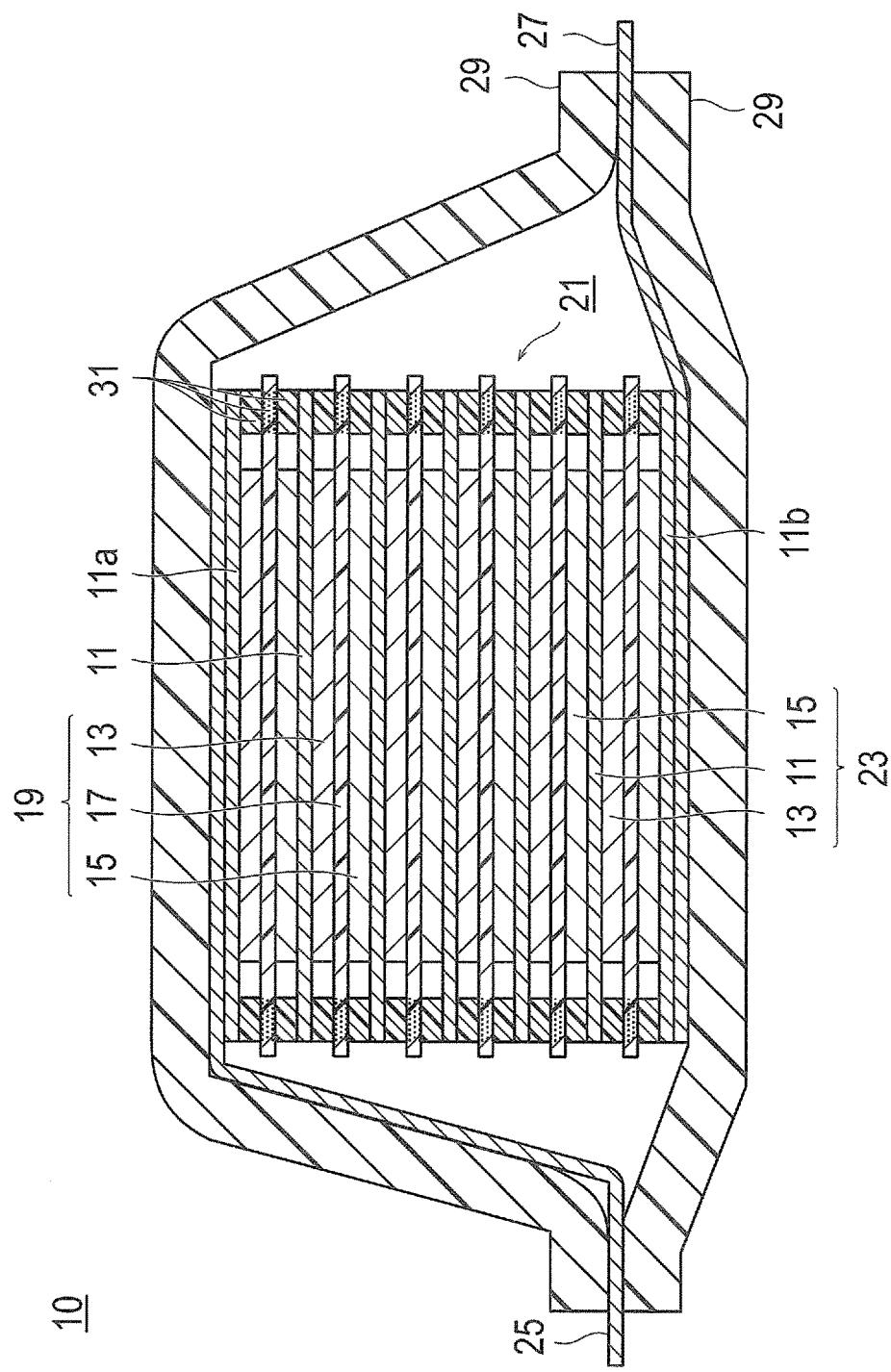
FIG. 1 is a cross-sectional view schematically illustrating a bipolar type secondary battery according to an embodiment of the present invention.

According to one embodiment of the present invention, there is provided a non-aqueous electrolyte secondary battery comprising a positive electrode having a positive electrode active material layer, a negative electrode having a negative electrode active material layer, and an electrolyte layer having an electrolyte solution containing a non-aqueous solvent, wherein at least one of the positive electrode active material layer and the negative electrode active material layer contains an electrode material for a non-aqueous electrolyte secondary battery having a core part including an electrode active material and a shell part including a conductive material in a base material formed by a gel-forming polymer having a liquid absorption rate with respect to the electrolyte solution of 10 to 200%.

According to the present invention, a shell part including a gel-forming polymer having a certain liquid absorption rate with respect to the electrolyte solution is present on the surface of a core part including an electrode active material, so that the electrode active material surface is coated by a gel electrolyte. Therefore, an interface that can suppress an electrochemical side reaction in the electrode active material surface can be formed on the surface of the electrode active material. In addition, a conductive path of lithium ion from the electrode active material surface is secured. Furthermore, a conductive material is included in the gel-forming polymer, a conductive path of electron from outside to the electrode active material surface can be structurally stably formed to have low resistance. As a result, the coulomb efficiency of the initial charge and discharge of a battery is improved, and a battery having a high energy density can be obtained.

The present inventors have intensively studied, in view of the objects described above (in a non-aqueous electrolyte secondary battery, to provide a means of forming an electrochemically stable active material/electrolyte interface and improving the energy density of the battery). In this process, it has been attempted to dispose a shell part formed by a polymer which forms a gel by swelling of a liquid electrolyte (gel-forming polymer) and a conductive material, on the surface of a core part obtained by coating the electrode active material surface with the conductive material. Then, it has been found based on the above that, when constituting a battery, the surface of the electrode active material is coated with a gel electrolyte, so that an interface that can suppress electrochemical side reaction in the electrode surface is formed. At this time, it has been found that a gel-forming polymer having a liquid absorption rate with respect to the electrolyte solution of 10 to 200% is used as a gel-forming polymer, thereby securing conductivity of lithium ion, thus coating with high adhesion is possible. Furthermore, the conductive material is used, so that a conductive path of electron can be structurally stably formed to have low resistance. As a result, the coulomb efficiency of the initial charge and discharge of a battery is improved, and a battery having a high energy density can be obtained.

Hereinafter, while referring to the drawings, a description will be made of an embodiment according to the present invention, but the technical scope of the present invention should be determined based on the scope of claims, and is not limited only to the following embodiments. Incidentally, the same reference numerals are assigned to the same elements in the description of the drawings, and duplicate descriptions are omitted. In addition, the scale of the drawings includes some exaggeration for descriptive reasons, and may thus be different from the actual dimension.

In the present specification, in some cases, a bipolar type lithium ion secondary battery is simply referred to as a "bipolar type secondary battery" and a bipolar type lithium ion secondary battery electrode is simply referred to as a "bipolar type electrode."

FIG. 1 is a cross-sectional view schematically illustrating a bipolar type secondary battery according to an embodiment of the present invention. A bipolar type secondary battery 10 illustrated in FIG. 1 has a configuration in which a power generating element 21 with a substantially rectangular shape, in which a charge and discharge reaction actually occurs, is sealed in the inside of a laminate film 29, which is a battery outer casing material.

As illustrated in FIG. 1, the power generating element 21 of the bipolar type secondary battery 10 according to this embodiment includes plural bipolar type electrodes 23 in which a positive electrode active material layer 13 electrically connected to one surface of a current collector 11 and a negative electrode active material layer 15 electrically connected to the other surface of the current collector 11 are formed. The respective bipolar type electrodes 23 are stacked on top of each other via electrolyte layers 17 to form the power generating element 21. Incidentally, the electrolyte layers 17 each have a configuration in which an electrolyte is held in the middle portion in the plane direction of a separator serving as a base material. At this time, the bipolar type electrodes 23 and the electrolyte layers 17 are alternately stacked in such a manner that the positive electrode active material layer 13 of one bipolar type electrode 23 faces the negative electrode active material layer 15 of another bipolar type electrode 23 adjacent to the one bipolar type electrode 23 via the electrolyte layer 17. That is, the electrolyte layer 17 is disposed to be interposed between the positive electrode active material layer 13 of one bipolar type electrode 23 and the negative electrode active material layer 15 of another bipolar type electrode 23 adjacent to the one bipolar type electrode 23.

The positive electrode active material layer 13, the electrolyte layer 17, and the negative electrode active material layer 15, which are adjacent to each other, constitute a single battery layer 19. Therefore, it can also be said that the bipolar type secondary battery 10 has a configuration in which the single battery layers 19 are stacked on top of each other. In addition, a sealing portion (insulating layer) 31 is provided on the periphery of each of the single battery layer 19. By this structure, liquid junction caused by leakage of an electrolyte solution from the electrolyte layer 17 is prevented and the contact between the current collectors 11 adjacent to each other inside the battery or occurrence of a short circuit caused by slight unevenness at the end portion of the single battery layer 19 in the power generating element 21 is prevented. Incidentally, the positive electrode active material layer 13 is formed on only one surface in an outermost layer positive electrode current collector 11a located on the outermost layer of the power generating element 21. Further, the negative electrode active material layer 15 is formed on only one surface in an outermost layer negative electrode current collector 11b located on the outermost layer of the power generating element 21.

Further, in the bipolar type secondary battery 10 illustrated in FIG. 1, a positive electrode current collecting plate 25 is disposed to be adjacent to the outermost layer positive electrode current collector 11a, and extends to be exposed on the outside of the laminate film 29, which is a battery outer casing material. Meanwhile, a negative electrode current collecting plate 27 is disposed to be adjacent to the outermost layer negative electrode current collector 11*b* and similarly extends to be exposed on the outside of the laminate film 29.

Incidentally, the number of the single battery layer 19 stacked is adjusted depending on a desired voltage. Further, the number of the single battery layer 19 stacked in the bipolar type secondary battery 10 may be minimized as long as sufficient output can be ensured even when the thickness of the battery is made thinner as much as possible. In order to prevent external damage at the time of operation and avoid environmental worsening, the bipolar type secondary battery 10 may also have a structure in which the power generating element 21 is sealed in the laminate film 29, which is a battery outer casing material under reduced pressure, and the positive electrode current collecting plate 25 and the negative electrode current collecting plate 27 are exposed on the outside of the laminate film 29. Incidentally, herein, the embodiment of the present invention has been described by using a bipolar type secondary battery as an example, but the type of a non-aqueous electrolyte battery to which the present invention can be applied is not particularly limited. The present invention can be applied to an arbitrary non-aqueous electrolyte secondary battery of the related art, such as a so-called parallel laminate type battery, in which single battery layers are connected in parallel in a power generating element.

Hereinafter, main constituent elements of the bipolar type secondary battery of this embodiment will be described.

(Current Collector)

A current collector serves as a medium for transferring electrons from one side coming into contact with the positive electrode active material layer to the other side coming into contact with the negative electrode active material layer. The material for forming the current collector is not particularly limited, but, for example, a metal or a resin having conductivity may be used.

Specific examples of the metal include aluminum, nickel, iron, stainless steel, titanium, and copper. In addition to them, a clad material of nickel and aluminum, a clad material of copper and aluminum, or a plating material of a combination of those metals may be preferably used. Furthermore, a foil obtained by coating a metal surface with aluminum may be used. Among them, from the viewpoint of electron conductivity, potential for operating a battery, adhesiveness of a negative electrode active material to a current collector by sputtering, or the like, aluminum, stainless steel, copper, and nickel are preferable.

Further, examples of the latter resin having conductivity include a resin in which conductive filler is added to a conductive polymer material or a non-conductive polymer material as necessary. Examples of the conductive polymer material include polyaniline, polypyrrole, polythiophene, polyacetylene, polyparaphenylene, polyphenylene vinylene, and polyoxadiazole. Such a conductive polymer material has an advantage in simplification of the manufacturing process and lightness of a current collector since the conductive polymer material has sufficient conductivity even if a conductive filler is not added thereto.

Examples of the non-conductive polymer material include polyethylene (PE; high-density polyethylene (HDPE), low-density polyethylene (LDPE), or the like), polypropylene (PP), polyethylene terephthalate (PET), polyether nitrile (PEN), polyimide (PI), polyamide imide (PAI), polyamide (PA), polytetrafluoroethylene (PTFE), styrene-butadiene rubber (SBR), polyacrylonitrile (PAN), polymethyl acrylate (PMA), polymethylmethacrylate (PMMA), polyvinyl chloride (PVC), polyvinylidene fluoride (PVdF), or polystyrene (PS). Such a non-conductive polymer material may have excellent potential tolerance or solvent tolerance.

A conductive filler may be added to the conductive polymer material or the non-conductive polymer material as necessary. In particular, when a resin serving as a base material of a current collector only includes a non-conductive polymer, the conductive filler is essential to provide the resin with conductivity.

The conductive filler can be used without particular limitation as long as it is a material having conductivity. Examples of a material having excellent conductivity, potential tolerance, or lithium ion insulation include metal and conductive carbon. The metal is not particularly limited, but the metal preferably includes at least one kind of metal selected from the group consisting of Ni, Ti, Al, Cu, Pt, Fe, Cr, Sn, Zn, In, and Sb, or an alloy or metal oxide containing these metals. Further, the conductive carbon is not particularly limited. The conductive carbon preferably includes at least one material selected from the group consisting of acetylene black, Vulcan, Black Pearls, carbon nanofiber, Ketjen black, carbon nanotube, carbon nanohorn, and carbon nanoballoon.

The amount of the conductive filler added is not particularly limited as long as it can provide the current collector with sufficient conductivity. In general, the amount is about 5 to 35% by mass.

Incidentally, the current collector of this embodiment may be a single-layered structure formed by a single material or a stacked structure in which layers formed by these materials are appropriately combined. From the viewpoint of lightness of the current collector, it is preferable to contain at least a conductive resin layer formed by a resin having conductivity. In addition, from the viewpoint of interrupting the movement of lithium ions between single battery layers, a metal layer may be provided on a portion of the current collector.

(Active Material Layer)

The positive electrode active material layer 13 contains a positive electrode active material as an electrode active material. The negative electrode active material layer 15 contains a negative electrode active material as an electrode active material. In the bipolar type secondary battery 10 according to this embodiment, the positive electrode active material layer 13 or the negative electrode active material layer 15 contains an electrode material having a core part including an electrode active material and a shell part including a conductive material in a base material formed by a gel-forming polymer having a liquid absorption rate with respect to the electrolyte solution of 10 to 200%.

Figure 2:
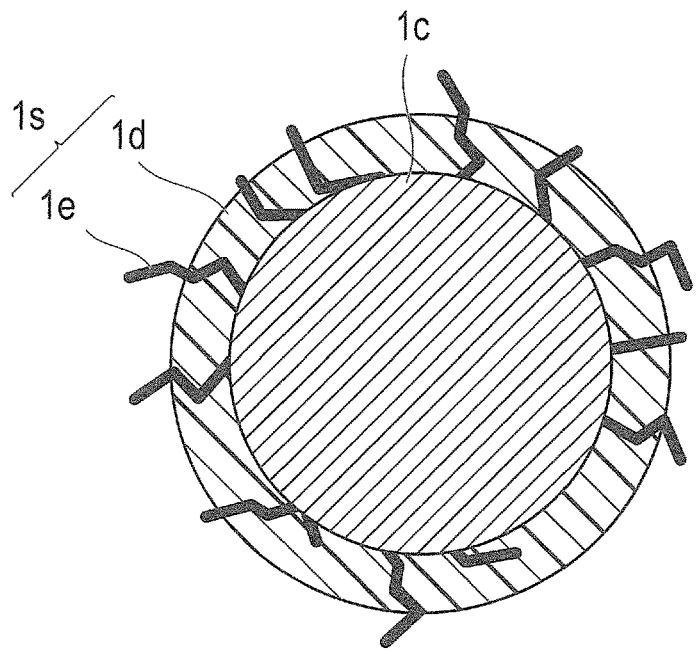
FIG. 2 is a cross-sectional view schematically illustrating an embodiment of a core-shell-type electrode material.

Specifically, in the bipolar type secondary battery 10 according to this embodiment, an electrode active material (positive electrode active material or negative electrode active material) is contained in the positive electrode active material layer 13 or the negative electrode active material layer 15, in a form of the core-shell-type electrode material as shown in FIG. 2.

A core-shell-type electrode material 1*a* illustrated in FIG. 2 is configured by a core part 1*c* including an electrode active material, and a shell part 1*s* with which the surface of the core part 1*c* is coated. Further, this shell part 1*s* is has a configuration in which a conductive material 1*e* is included in a base material 1*d* formed by a gel-forming polymer having a predetermined liquid absorption rate with respect to the electrolyte solution. Incidentally, in FIG. 2, the entire surface of the core part 1*c* is coated with the shell part 1*s*.

However, without being limited thereto, it is enough that a part of the surface of the core part 1c is coated, and the embodiment that a part of the surface of the core part 1c is coated is also included in the scope of the present invention. In a preferred embodiment, 50% by area or more of the surface of the core part 1c is preferably coated with the shell part 1s, more preferably 60% by area or more thereof, further preferably 70% by area or more thereof, particularly preferably 80% by area or more thereof, and most preferably 90% by area or more thereof.

Hereinafter, the details of the core part 1c and shell part 1s of the core-shell-type electrode material will be described. The core-shell-type electrode material can be applied as either positive electrode material or negative electrode material.

(Core Part 1c)

In this embodiment, the core part 1c includes a positive electrode active material or a negative electrode active material.

(Negative Electrode Active Material)

Examples of the negative electrode active material include a carbon material such as graphite (black lead), soft carbon, or hard carbon, a lithium-transition metal composite oxide (for example, $Li_4Ti_5O_{12}$), a metal material, and a lithium alloy-based negative electrode material. If necessary, two or more kinds of a negative electrode active material may be concurrently used. Preferably, from the viewpoint of capacity and output characteristics, a carbon material or a lithium-transition metal composite oxide is used as a negative electrode active material. Incidentally, it is needless to say that a negative electrode active material other than those described above may also be used. Further, a base material (gel-forming polymer) constituting the shell part 1s in the core-shell-type electrode material according to the present invention has a property of easily adhering with respect to particularly a carbon material. For this reason, from the viewpoint of providing an electrode material with a stable structure, it is preferable to use a carbon material as a negative electrode active material in the present invention.

The average particle diameter of the negative electrode active material (in the case of a core-shell-type electrode material, the average particle diameter of the core part) is not particularly limited, but from the viewpoint of having higher output power, the average particle diameter is preferably 1 to 100 μm, and more preferably 1 to 20 μm.

(Positive Electrode Active Material)

Examples of the positive electrode active material include a lithium-transition metal composite oxide such as $LiMn_2O_4$, $LiCoO_2$, $LiNiO_2$, $Li(Ni-Mn-Co)O_2$, and a compound in which a part of these transition metals is replaced with another element, a lithium-transition metal phosphate compound, and a lithium-transition metal sulfate compound. In some cases, two or more kinds of the positive electrode active materials may be concurrently used. From the viewpoint of capacity and output characteristics, a lithium-transition metal composite oxide is preferably used as a positive electrode active material. A composite oxide containing lithium and nickel is more preferably used, and $Li(Ni-Mn-Co)O_2$ and a composite oxide in which a part of these transition metals is replaced with another element (hereinafter, also simply referred to as "NMC composite oxide") are further preferably used. The NMC composite oxide has a layered crystal structure in which a lithium atom layer and a transition metal (Mn, Ni, and Co are arranged with regularity) atom layer are alternately stacked via an oxygen atom layer. One Li atom is included per atom of transition metal M and extractable Li amount is twice the amount of spinel lithium manganese oxide, that is, as the supply power is two times higher, it can have high capacity.

As described above, the NMC composite oxide includes a composite oxide in which a part of transition metal element is replaced with another metal element. In this case, examples of another metal element include Ti, Zr, Nb, W, P, Al, Mg, V, Ca, Sr, Cr, Fe, B, Ga, In, Si, Mo, Y, Sn, V, Cu, Ag, and Zn. Ti, Zr, Nb, W, P, Al, Mg, V, Ca, Sr, and Cr are preferable, Ti, Zr, P, Al, Mg, and Cr are more preferable, and from the viewpoint of improving the cycle characteristics, Ti, Zr, Al, Mg, and Cr are further preferable.

By having a high theoretical discharge capacity, the NMC composite oxide preferably has a composition represented by General Formula (1): $Li_aNi_bMn_cCo_dM_xO_2$ (with the proviso that, in the formula, a, b, c, d, and x satisfy $0.9 \leq a \leq 1.2$, $0 < b < 1$, $0 < c \leq 0.5$, $0 < d \leq 0.5$, $0 \leq x \leq 0.3$, $b+c+d=1$. M is at least one element selected from Ti, Zr, Nb, W, P, Al, Mg, V, Ca, Sr, and Cr). Herein, a represents the atomic ratio of Li, b represents the atomic ratio of Ni, c represents the atomic ratio of Mn, d represents the atomic ratio of Co, and x represents the atomic ratio of M. From the viewpoint of the cycle characteristics, it is preferable that $0.4 \leq b \leq 0.6$ in General Formula (1). Incidentally, the composition of each element can be measured, for example, by inductively coupled plasma (ICP) atomic emission spectrometry.

In general, from the viewpoint of improving purity and improving electron conductivity of a material, nickel (Ni), cobalt (Co), and manganese (Mn) are known to contribute to capacity and output characteristics. Ti or the like replaces a part of transition metal in a crystal lattice. From the viewpoint of the cycle characteristics, it is preferable that a part of transition element be replaced by another metal element, and particularly, it is preferable that $0 < x \leq 0.3$ in General Formula (1). It is considered that the crystal structure is stabilized by dissolving at least one selected from the group consisting of Ti, Zr, Nb, W, P, Al, Mg, V, Ca, Sr, and Cr so that a decrease in capacity of a battery can be prevented even when charge and discharge are repeated, and thus excellent cycle characteristics can be realized.

As a more preferred embodiment, from the viewpoint of improving a balance between capacity and lifetime characteristics, it is preferable that b, c, and d in General Formula (1) be $0.44 \leq b \leq 0.51$, $0.27 \leq c \leq 0.31$, and $0.19 \leq d \leq 0.26$. For example, as compared with $LiCoO_2$, $LiMn_2O_4$, $LiNi_{1/3}Mn_{1/3}Co_{1/3}O_2$, and the like that exhibit actual performance in a general consumer use battery, $LiNi_{0.5}Mn_{0.3}Co_{0.2}O_2$ has a large capacity per unit weight, and can improve the energy density. Thus, $LiNi_{0.5}Mn_{0.3}Co_{0.2}O_2$ has an advantage that a compact and high capacity battery can be produced, and is also preferable, from the viewpoint of a cruising distance. Incidentally, in terms of having a larger capacity, $LiNi_{0.8}Co_{0.1}Al_{0.1}O_2$ is more advantageous, but has a problem in lifetime characteristics. On the other hand, $LiNi_{0.5}Mn_{0.3}Co_{0.2}O_2$ has lifetime characteristics as excellent as $LiNi_{1/3}Mn_{1/3}Co_{1/3}O_2$.

Incidentally, it is needless to say that a positive electrode active material other than the aforementioned positive electrode active material may be used. In addition, the average particle diameter of the positive electrode active material contained in the positive electrode active material layer (in the case of a core-shell-type electrode material, the average particle diameter of the core part) is not particularly limited, but from the viewpoint of having higher output power, the average particle diameter is preferably 1 to 100 μm, and more preferably 1 to 20 μm.

(Positive Electrode Active Material Coated with Carbon Material)

The core-shell-type electrode material shown in the present embodiment may contain a positive electrode active material coated with a carbon material obtained by coating at least a part of the surface of the positive electrode active material described above with the carbon material, as the core part.

In this case, due to affinity between the gel-forming polymer constituting the shell part and the carbon material, a positive electrode active material can firmly hold a base material formed by the gel-forming polymer via the carbon material. Specifically, the core part $1c$ and the shell part $1s$ are firmly adhered. Therefore, a structurally stable electrode material can be provided. In addition, even when the conductivity of the positive electrode active material itself is low, the positive electrode active material is coated with the carbon material, so that the conductivity of the core part $1c$ can be improved, due to the conductivity of the carbon material.

The carbon material for coating the positive electrode active material is not particularly limited, and any material that can coat at least a part of the surface of the positive electrode active material can be used. For example, the carbon material may be the same as the material used as a conductive aid (additive added for improving conductivity of the electrode active material layer).

Specifically, examples of the carbon material include acetylene black, furnace black, carbon black, channel black, graphite, and the like. Among them, from the viewpoint of maintaining coating of the carbon material, by suppressing insertion and desorption of Li ion, the carbon material preferably has low crystallinity, and acetylene black is more preferably used.

Also, the carbon material to be used can be properly changed by a method used when coating the active material. Therefore, a carbon material other than the above may be used, depending on the method for coating the active material with the carbon material. For example, when coating is carried out by the sintering method detailed below, a water-soluble polymer such as polyvinyl alcohol and sucrose is preferably used as a carbon source for coating the active material. Among them, polyvinyl alcohol is preferred.

The shape of the carbon material (shape when coated on the active material) is also not particularly limited, and may be particle form or fiber form. Particle form is preferred in ease of coating, and fiber form is preferred in conductivity. The size of the carbon material is also not particularly limited. For example, in the case where the carbon material is particle form, the average particle diameter (secondary particle diameter) is preferably 10 to 200 nm, and more preferably 20 to 150 nm. Also, in the case where the carbon material is fiber form, the diameter is preferably 20 to 500 nm, and more preferably 50 to 300 nm, and the length is preferably 5 to 20 µm, and more preferably 8 to 15 µm. With the size as above, the carbon material is easily coated on the surface of the active material. Also, with the size as above, the carbon material is uniformly coated on the surface of the active material.

Next, a method for coating a positive electrode active material using a carbon material will be described. In the coating method, a physical or chemical treatment method for chemically or physically binding (coating) a carbon material to the positive electrode active material surface is not particularly limited. Examples include a method of embedding at least a part of the carbon material in the positive electrode active material by shearing, a method of chemically binding via the positive electrode active material and a functional group on the carbon material surface, and the like. More specific examples include a sintering (calcination) method, a mechanochemical method (surface treatment by hybridizer), a liquid phase method, a chemical vapor deposition (CVD) method, and the like. Among them, a sintering (calcination) method and a mechanochemical method are preferably used.

The physical or chemical treatment condition for chemically or physically binding (coating) a carbon material to the positive electrode active material surface is not particularly limited, and can be properly selected depending on the used method.

Hereinbelow, two methods will be detailed as a preferred procedure as the coating method of a carbon material.

(i) Sintering (Calcination) Method

When using a sintering (calcination) method, specifically, it is preferred to be prepared through the following steps. Specifically, first, an aqueous solution of water-soluble polymer is prepared (step 1). Next, a positive electrode active material is dispersed in the aqueous solution of water-soluble polymer prepared in the step 1 (step 2). Then, water is evaporated from the aqueous solution prepared in the step 2, and the obtained solid is dried (step 3). Further, the solid obtained in the step 3 is calcined (step 4). By going through the steps 1 to 4 as described above, a positive electrode active material coated with a carbon material (i.e., core part $1c$) can be obtained.

In the above step 1, in the aqueous solution of water-soluble polymer, the water-soluble polymer concentration is not particularly limited, but is preferably 0.1 to 50 parts by mass, more preferably 1 to 30 parts by mass, and particularly preferably 1.5 to 10 parts by mass, relative to 100 parts by mass of water. Also, when preparing the aqueous solution of water-soluble polymer, the aqueous solution may be prepared while heating. At this time, the temperature of the aqueous solution is not particularly limited, and is preferably 40 to 98° C., and particularly preferably 50 to 95° C.

In the above step 2, it is preferred to disperse the positive electrode active material while stirring the aqueous solution of water-soluble polymer. At this time, the amount of the positive electrode active material dispersed in the aqueous solution of water-soluble polymer is not particularly limited, but is preferably 0.1 to 50 parts by mass, more preferably 1 to 30 parts by mass, and particularly preferably 5 to 20 parts by mass, relative to 100 parts by mass of the aqueous solution of water-soluble polymer. Also, the mass ratio of the water-soluble polymer used in the above step 1 to the positive electrode active material is not particularly limited, but is preferably 1:99 to 99:1, more preferably 5:85 to 85:5, and further preferably 8:92 to 92:8. When dispersing the positive electrode active material in the aqueous solution of water-soluble polymer, the aqueous solution may be prepared while heating. At this time, the temperature of the aqueous solution is not particularly limited, and is preferably 40 to 98° C., and particularly preferably 50 to 95° C.

In the above step 3, it is preferred to heat the aqueous solution while stirring, for efficiently evaporating water from the aqueous solution of water-soluble polymer in which the positive electrode active material is dispersed, prepared in the above step 2. At this time, the heating temperature is not particularly limited, as long as it is a temperature at which water is evaporated. After almost all amount of water is evaporated, it is preferred to further dry the obtained solid. The drying method at this time is not particularly limited, and methods such as natural drying, a reduced-pressure drying method, and a blast drying method can be used. Also, the drying temperature is not particularly limited, and is preferably 100 to 180° C., and more preferably 110 to 160° C. In the above step 4, the solid (raw material of sintered body) obtained in the above step 3 can be calcined using a known calcining (sintering) device such as an electric furnace or belt furnace. By carrying out calcination in the present step 4, at least a part of the positive electrode active material surface can be coated with the carbon material. At this time, the calcination temperature is not particularly limited, and is preferably 200 to 1000° C., more preferably 300 to 800° C., and particularly preferably 350 to 500° C. Also, the calcination time (heating time) is not also particularly limited, and is preferably 10 minutes to 5 hours, more preferably 20 minutes to 3 hours, and particularly preferably 30 minutes to 1 hour.

The positive electrode active material coated with a carbon material (i.e., core part 1c) obtained through the steps 1 to 4 above may be pulverized to a desired particle size, as necessary.

(ii) Mechanochemical Method

In the mechanochemical method, the surface of a positive electrode active material is coated with a carbon material, using a known apparatus such as ACM pulverizer, innomizer, impeller mill, turbo mill, hammer mill, fine mill, Xepros, or hybridizer. At this time, the rotational speed (treatment rotational speed) is preferably 1,000 to 20,000 rpm, and more preferably 3,000 to 18,000 rpm. Also, the load power is preferably 200 to 800 W, and more preferably 400 to 650 W. The treatment time is preferably from 1 to 60 min, and more preferably from 2 to 10 min. In the conditions as above, the carbon material can be coated (carried) on the positive electrode active material surface at the above preferred coating rate (carrying rate). Also, the carbon material can be uniformly coated on the positive electrode active material surface.

(Shell Part 1s)

In this embodiment, the shell part 1s has a configuration in which a conductive material 1e is included in the base material 1d formed by a gel-forming polymer. Incidentally, in a case where an electrolyte contained in an electrolyte layer to be described later contains an electrolyte solution (that is, the electrolyte is a liquid electrolyte or a gel electrolyte), the electrolyte solution derived from the electrolyte contained in the electrolyte layer is typically infiltrated in the negative electrode active material layer 1. For this reason, the base material (gel-forming polymer) constituting the shell part 1s absorbs the electrolyte solution to be swollen so that the base material becomes a gel state.

The thickness of the shell part is not particularly limited, but as a thickness of a state in which a gel is not formed, the thickness thereof is preferably 0.01 to 5 μm, and more preferably 0.1 to 2 μm. In addition, as a thickness after the shell part is immersed in an electrolyte solution (1M LiPF$_6$, ethylene carbonate (EC)/diethyl carbonate (DEC)=3/7 (volume ratio)) at 50° C. for 3 days, the thickness thereof is preferably 0.01 to 10 μm, and more preferably 0.1 to 5 μm.

The constitution material of the base material 1d is not particularly limited, and may be a gel-forming polymer having a liquid absorption rate with respect to the electrolyte solution of 10 to 200%. The term "the liquid absorption rate with respect to the electrolyte solution" is an index representing the swelling degree of the gel-forming polymer, which is a constitution material of the base material 1d, and is a value obtained by a measurement method described in the section of Examples to be described later. When the liquid absorption rate with respect to the electrolyte solution of the gel-forming polymer is less than 10%, ion conductivity is lowered, thus the battery reaction is inhibited, and a battery having a high energy density cannot be obtained. On the other hand, when the liquid absorption rate with respect to the electrolyte solution of the gel-forming polymer exceeds 200%, peeling may occur in the interface with a resin formed on the electrode active material surface. In addition, the effect of suppressing the side reaction on the electrode active material surface may be reduced. Therefore, the coulomb efficiency of the initial charge and discharge of a battery is consequently lowered. The liquid absorption rate with respect to the electrolyte solution of the gel-forming polymer is preferably 5 to 200%, more preferably 10 to 120%, and particularly preferably 20 to 80%.

Here, the term "the liquid absorption rate with respect to the electrolyte solution" herein refers to a value measured using an electrolyte solution obtained by dissolving LiPF$_6$ as a lithium salt in a solution of ethylene carbonate (EC) and diethyl carbonate (DEC) mixed at a volume ratio of EC:DEC=3:7, so as to have a concentration of 1 mol/L, as in Examples to be described later. However, the electrolyte solution used when producing the non-aqueous electrolyte secondary battery of the present invention is not limited thereto, and other electrolyte solution may be used.

The gel-forming polymer may be either thermoplastic resin or thermosetting resin, and examples include vinyl resins (A), urethane resins (B), polyester resins (C), polyamide resins (D), other resins (E), mixtures thereof, and the like. Among them, vinyl resins (A), urethane resins (B), polyester resins (C), polyamide resins (D), and mixtures thereof are preferred, and vinyl resins (A) are more preferred.

The vinyl resin (A) is a resin comprising a polymer (A1) having a vinyl monomer (a) as an essential constituent monomer. The vinyl resin is preferred since it can form a stable gel polymer in the non-aqueous electrolyte, and thus the electrochemically stable active material/electrolyte interface is formed.

Specifically, from the viewpoint of forming a stable gel polymer in the non-aqueous electrolyte, it is desirable that the polymer (A1) contains a vinyl monomer (a1) having a carboxyl group and a vinyl monomer (a2) represented by General Formula (1) below as vinyl monomers (a).

[Chemical Formula 1]

$$CH_2=C(R^1)COOR^2 \qquad (1)$$

wherein R$^1$ is a hydrogen atom or a methyl group, and R$^2$ is a branched alkyl group having 4 to 36 carbon atoms.

Examples of the vinyl monomer (a1) having a carboxyl group include monocarboxylic acids having 3 to 15 carbon atoms such as (meth)acrylic acid, crotonic acid, and cinnamic acid; dicarboxylic acids having 4 to 24 carbon atoms such as (anhydrous) maleic acid, fumaric acid, (anhydrous) itaconic acid, citraconic acid, and mesaconic acid; trivalent, tetravalent or higher valent polycarboxylic acids having 6 to 24 carbon atoms such as aconitic acid, and the like. Among them, (meth)acrylic acid is preferred, and methacrylic acid is particularly preferred.

In the vinyl monomer (a2) represented by General Formula (1), R$^1$ represents a hydrogen atom or methyl group. R$^1$ is preferably a methyl group.

R$^2$ is a branched alkyl group having 4 to 36 carbon atoms, and specific examples of R$^2$ include 1-alkylalkyl groups (1-methylpropyl group (sec-butyl group), 1,1-dimethylethyl group (tert-butyl group), 1-methylbutyl group, 1-ethylpropyl group, 1,1-dimethylpropyl group, 1-methylpentyl group, 1-ethylbutyl group, 1-methylhexyl group, 1-ethylpentyl group, 1-methylheptyl group, 1-ethylhexyl group, 1-methyloctyl group, 1-ethylheptyl group, 1-methylnonyl group, 1-ethyloctyl group, 1-methyldecyl group, 1-ethylnonyl group, 1-butyleicosyl group, 1-hexyloctadecyl group, 1-octylhexadecyl group, 1-decyltetradecyl group, 1-undecyltridecyl group, etc.), 2-alkylalkyl groups (2-methylpropyl group (iso-butyl group), 2-methylbutyl group, 2-ethylpropyl group, 2,2-dimethylpropyl group, 2-methylpentyl group, 2-ethylbutyl group, 2-methylhexyl group, 2-ethylpentyl group, 2-methylheptyl group, 2-ethylhexyl group, 2-methyloctyl group, 2-ethylheptyl group, 2-methylnonyl group, 2-ethyloctyl group, 2-methyldecyl group, 2-ethylnonyl group, 2-hexyloctadecyl group, 2-octylhexadecyl group, 2-decyltetradecyl group, 2-undecyltridecyl group, 2-dodecylhexadecyl group, 2-tridecylpentadecyl group, 2-decyloctadecyl group, 2-tetradecyloctadecyl group, 2-hexadecyloctadecyl group, 2-tetradecyleicosyl group, 2-hexadecyleicosyl group, etc.), 3 to 34-alkylalkyl groups (3-alkylalkyl groups, 4-alkylalkyl groups, 5-alkylalkyl groups, 32-alkylalkyl groups, 33-alkylalkyl groups, 34-alkylalkyl groups, etc.), mixed alkyl groups containing one or more branched alkyl groups such as alkyl residues of oxoalcohols corresponding to propylene oligomers (heptamer to undecamer), ethylene/propylene (molar ratio of 16/1 to 1/11) oligomers, isobutylene oligomers (heptamer to octamer), α-olefin (5 to 20 carbon atoms) oligomers (tetramer to octamer), and the like.

Among them, preferred are 2-alkylalkyl groups, and further preferred are 2-ethylhexyl group and 2-decyltetradecyl group.

Also, the monomer constituting the polymer (A1) may contain a copolymerizable vinyl monomer (a3) not containing an active hydrogen, other than the vinyl monomer (a1) and the vinyl monomer (a2) represented by General Formula (1).

The copolymerizable vinyl monomer (a3) not containing an active hydrogen includes the following (a31) to (a35).

(a31) Hydrocarbyl (meth)acrylates formed from a monool having 1 to 20 carbon atoms and (meth)acrylic acid The monool includes (i) aliphatic monools [methanol, ethanol, n- and i-propyl alcohol, n-butyl alcohol, n-pentyl alcohol, n-octyl alcohol, nonyl alcohol, decyl alcohol, lauryl alcohol, tridecyl alcohol, myristyl alcohol, cetyl alcohol, stearyl alcohol, etc.], (ii) alicyclic monools [cyclohexyl alcohol, etc.], (iii) araliphatic monools [benzyl alcohol, etc.], and two or more mixtures thereof.

(a32) Poly (n=2 to 30) oxyalkylene (2 to 4 carbon atoms) alkyl (1 to 18 carbon atoms) ether (meth)acrylates [methanol 10 mol ethylene oxide (hereinafter abbreviated as EO) adduct (meth)acrylate, methanol 10 mol propylene oxide (hereinafter abbreviated as PO) adduct (meth)acrylate, etc.]

(a33) Nitrogen-containing vinyl compounds (a33-1) Amide group-containing vinyl compounds (i) (Meth)acrylamide compounds having 3 to 30 carbon atoms, e.g., N,N-dialkyl (1 to 6 carbon atoms) or diaralkyl (7 to 15 carbon atoms) (meth)acrylamides [N,N-dimethylacrylamide, N,N-dibenzylacrylamide, etc.], diacetone acrylamide (ii) Amide group-containing vinyl compounds having 4 to 20 carbon atoms, except for the above (meth)acrylamide compounds, e.g., N-methyl-N-vinylacetamide, cyclic amides (pyrrolidone compounds (6 to 13 carbon atoms, e.g., N-vinylpyrrolidone))

(a33-2) (Meth)acrylate compounds (i) Dialkyl (1 to 4 carbon atoms) aminoalkyl (1 to 4 carbon atoms) (meth)acrylates [N,N-dimethylaminoethyl (meth)acrylate, N,N-diethylaminoethyl (meth)acrylate, t-butylaminoethyl (meth)acrylate, morpholinoethyl (meth)acrylate, etc.]

(ii) Quaternary ammonium group-containing (meth)acrylates {quaternized products (quaternized using the above quaternizing agent) of tertiary amino group-containing (meth)acrylates [N,N-dimethylaminoethyl (meth)acrylate, N,N-diethylaminoethyl (meth)acrylate, etc.], etc.}

(a33-3) Heterocyclic ring-containing vinyl compounds

Pyridine compounds (7 to 14 carbon atoms, e.g., 2- and 4-vinylpyridine), imidazole compounds (5 to 12 carbon atoms, e.g., N-vinylimidazole), pyrrole compounds (6 to 13 carbon atoms, e.g., N-vinylpyrrole), and pyrrolidone compounds (6 to 13 carbon atoms, e.g., N-vinyl-2-pyrrolidone)

(a33-4) Nitrile group-containing vinyl compounds

Nitrile group-containing vinyl compounds having 3 to 15 carbon atoms, e.g., (meth)acrylonitrile, cyanostyrene, and cyanoalkyl (1 to 4 carbon atoms) acrylates (a33-5) Other vinyl compounds Nitro group-containing vinyl compounds (8 to 16 carbon atoms, e.g., nitrostyrene), etc.

(a34) Vinyl hydrocarbons (a34-1) Aliphatic vinyl hydrocarbons

Olefins having 2 to 18 or more carbon atoms [ethylene, propylene, butene, isobutylene, pentene, heptene, diisobutylene, octene, dodecene, octadecene, etc.], dienes having 4 to 10 or more carbon atoms [butadiene, isoprene, 1,4-pentadiene, 1,5-hexadiene, 1,7-octadiene, etc.], etc.

(a34-2) Alicyclic vinyl hydrocarbons

Cyclic unsaturated compounds having 4 to 18 or more carbon atoms, e.g., cycloalkenes (e.g., cyclohexene), (di)cycloalkadienes [e.g., (di)cyclopentadiene], terpenes (e.g., pinene, limonene, and indene)

(a34-3) Aromatic vinyl hydrocarbons

Aromatic unsaturated compounds having 8 to 20 or more carbon atoms, e.g., styrene, α-methylstyrene, vinyltoluene, 2,4-dimethylstyrene, ethylstyrene, isopropylstyrene, butylstyrene, phenylstyrene, cyclohexylstyrene, and benzylstyrene (a35) Vinyl esters, vinyl ethers, vinyl ketones, and unsaturated dicarboxylic acid diesters (a35-1) Vinyl esters Aliphatic vinyl esters [4 to 15 carbon atoms, e.g., alkenyl esters of aliphatic carboxylic acids (mono- and di-carboxylic acids) (e.g., vinyl acetate, vinyl propionate, vinyl butylate, diallyl adipate, isopropenyl acetate, vinylmethoxy acetate)]

Aromatic vinyl esters [9 to 20 carbon atoms, e.g., alkenyl esters of aromatic carboxylic acids (mono- and di-carboxylic acids) (e.g., vinyl benzoate, diallyl phthalate, methyl-4-vinyl benzoate), aromatic ring-containing esters of aliphatic carboxylic acid (e.g., acetoxystyrene)]

(a35-2) Vinyl ethers

Aliphatic vinyl ethers {3 to 15 carbon atoms, e.g., vinyl alkyl (1 to 10 carbon atoms) ethers [vinyl methyl ether, vinyl butyl ether, vinyl 2-ethyl hexyl ether, etc.], vinyl alkoxy (1 to 6 carbon atoms) alkyl (1 to 4 carbon atoms) ethers [vinyl-2-methoxyethyl ether, methoxybutadiene, 3,4-dihydro-1,2-pyran, 2-butoxy-2'-vinyloxy diethyl ether, vinyl 2-ethylmercaptoethyl ether, etc.], poly (2 to 4) (meth)allyloxyalkanes (2 to 6 carbon atoms) [diallyloxyethane, triallyloxyethane, tetraallyloxybutane, tetramethallyloxyethane, etc.]}

Aromatic vinyl ethers (8 to 20 carbon atoms, e.g., vinyl phenyl ether, phenoxy styrene)

(a35-3) Vinyl ketones

Aliphatic vinyl ketones (4 to 25 carbon atoms, e.g., vinyl methyl ketone, vinyl ethyl ketone)

Aromatic vinyl ketones (9 to 21 carbon atoms, e.g., vinyl phenyl ketone)

(a35-4) Unsaturated dicarboxylic acid diesters

Unsaturated dicarboxylic acid diesters having 4 to 34 carbon atoms, e.g., dialkyl fumarates (two alkyl groups are linear, branched, or alicyclic groups having 1 to 22 carbon atoms), dialkyl maleates (two alkyl groups are linear, branched, or alicyclic groups having 1 to 22 carbon atoms).

Among those exemplified as (a3) above, (a31), (a32) and (a33) are preferred from the viewpoint of withstand voltage, and further preferred are methyl (meth)acrylate, ethyl (meth) acrylate, and butyl (meth)acrylate, among (a31).

In the polymer (A1), the contents of the vinyl monomer (a1) having a carboxyl group, the vinyl monomer (a2) represented by General Formula (1), and the copolymerizable vinyl monomer (a3) not containing an active hydrogen are desirably 0.1 to 80% by mass for (a1), 0.1 to 99.9% by mass for (a2), and 0 to 99.8% by mass for (a3), respectively, based on the mass of the polymer (A1).

When the content of the monomer is within the above range, liquid absorbency to the electrolyte solution is good.

More desirable contents are 30 to 60% by mass for (a1), 5 to 60% by mass for (a2), and 5 to 80% by mass for (a3), and further desirable contents are 35 to 50% by mass for (a1), 15 to 45% by mass for (a2), and 20 to 60% by mass for (a3).

Also, the monomer constituting the polymer (A1) may contain a hydroxyalkyl acrylate (a4), other than the vinyl monomer (a1) and the vinyl monomer (a2) represented by General Formula (1). By adding a hydroxyalkyl acrylate (a4), liquid absorbency with respect to the electrolyte solution can be adjusted. As the hydroxyalkyl acrylate, those having an alkyl group having 2 to 20 carbon atoms are preferred, and examples include 2-hydroxyethyl acrylate, 2-hydroxyethyl methacrylate, 2-hydroxypropyl acrylate, 2-hydroxypropyl methacrylate, 4-hydroxybutyl acrylate, and the like.

In the polymer (A1), the contents of the vinyl monomer (a1) having a carboxyl group, the vinyl monomer (a2) represented by General Formula (1), and the hydroxyalkyl acrylate (a4) are desirably 0.1 to 80% by mass for (a1), 0.1 to 99.9% by mass for (a2), and 0 to 99.8% by mass for (a4), respectively, based on the mass of the polymer (A1). When the content of the monomer is within the above range, liquid absorbency to the electrolyte solution is good.

More desirable contents are 30 to 60% by mass for (a1), 5 to 60% by mass for (a2), and 5 to 80% by mass for (a4), and further desirable contents are 35 to 50% by mass for (a1), 15 to 45% by mass for (a2), and 20 to 60% by mass for (a4).

Other preferred embodiment of the polymer (A1) includes a polymer containing the vinyl monomer (a1) having a carboxyl group and the (a33) nitrogen-containing vinyl compound, as vinyl monomers (a). The above polymer is excellent in liquid absorbency with respect to the electrolyte solution. Among them, a polymer containing the vinyl monomer (a1) having a carboxyl group and (a33-3) heterocyclic ring-containing vinyl compound can be preferably used.

In this embodiment, the contents are desirably 0.1 to 99.9% by mass for (a1), and 0.1 to 99.9% by mass for (a33), more preferably, 20 to 80% by mass for (a1), and 80 to 20% by mass for (a33), and further preferably, 30 to 50% by mass for (a1), and 50 to 70% by mass for (a33), based on the mass of the polymer (A1). When the content of each monomer is within the above range, a gel-forming polymer having good liquid absorbency with respect to the electrolyte solution can be obtained.

The lower limit of the number average molecular weight of the polymer (A1) is preferably 3,000, further preferably 50,000, particularly preferably 100,000, and most preferably 200,000, and the upper limit of the number average molecular weight is preferably 2,000,000, further preferably 1,500,000, particularly preferably 1,000,000, and most preferably 800,000.

The number average molecular weight of the polymer (A1) can be determined by a gel permeation chromatography (hereinafter, abbreviated as GPC) measurement, in the following conditions.

Apparatus: Alliance GPC V2000 (manufactured by Waters Corporation)
Solvent: Ortho-dichlorobenzene
Standard material: Polystyrene
Sample Concentration: 3 mg/ml
Column stationary phase: PLgel 10 μm, two MIXED-B in series (manufactured by Polymer Laboratories Ltd.)
Column temperature: 135° C.

Solubility parameter (hereinafter, abbreviated as SP value) of the polymer (A1) is desirably 9.0 to 20.0 $(\text{cal}/\text{cm}^3)^{1/2}$. The SP value of the polymer (A1) is more desirably 10.0 to 18.0 $(\text{cal}/\text{cm}^3)^{1/2}$, and further desirably 11.5 to 14.0 $(\text{cal}/\text{cm}^3)^{1/2}$. When the SP value of the polymer (A1) is 9.0 to 20.0 $(\text{cal}/\text{cm}^3)^{1/2}$, it is preferable in terms of liquid absorption of the electrolyte solution.

The SP value is calculated by Fedors method. The SP value is represented by the following equation.

$$\text{SP value } (\delta) = (\Delta H/V)^{1/2}$$

wherein ΔH represents molar evaporation heat (cal), and V represents molar volume $(\text{cm}^3)$.

Also, as ΔH and V, the sum of molar evaporation heat (ΔH) and the sum of molar volume (V) of atomic groups described in "POLYMER ENGINEERING AND SCIENCE, 1974, Vol. 14, No. 2, ROBERT F. FEDORS. (pages 151 to 153)" can be used.

It is an index representing that polymers having close numerical values are easy to be mixed each other (compatibility is high), and polymers having numerical values apart from each other are hard to be mixed.

Also, the glass transition point [hereinafter abbreviated as Tg, measurement method: DSC (differential scanning calorimetry) method] of the polymer (A1) is preferably 80 to 200° C., further preferably 90 to 180° C., and particularly preferably 100 to 150° C., from the viewpoint of heat resistance of a battery.

The polymer (A1) can be produced by a known polymerization method (bulk polymerization, solution polymerization, emulsion polymerization, suspension polymerization, etc.).

The polymerization can be carried out using a known polymerization initiator {azo-based initiators [2,2'-azobis(2-methylpropionitrile), 2,2'-azobis(2,4-dimethylvaleronitrile, etc.); peroxide-based initiators (benzoyl peroxide, di-t-butyl peroxide, lauryl peroxide, etc.)], and the like}.

The use amount of the polymerization initiator is preferably 0.01 to 5% by mass, and more preferably 0.05 to 2% by mass, based on the total mass of the monomers.

Examples of the solvent used in the case of solution polymerization include esters (2 to 8 carbon atoms, e.g., ethyl acetate and butyl acetate), alcohols (1 to 8 carbon atoms, e.g., methanol, ethanol, and octanol), hydrocarbons (4 to 8 carbon atoms, e.g., n-butane, cyclohexane, and toluene) and ketones (3 to 9 carbon atoms, e.g., methyl ethyl ketone). The use amount of the solvent is usually 5 to 900%, and preferably 10 to 400%, based on the total mass of the monomers, and the monomer concentration is usually 10 to 95% by mass, and preferably 20 to 90% by mass.

The dispersion medium in emulsion polymerization and suspension polymerization includes water, alcohols (e.g., ethanol), esters (e.g., ethyl propionate), light naphtha, and the like, and the emulsifier includes higher fatty acid (10 to 24 carbon atoms) metal salts (e.g., sodium oleate and sodium stearate), higher alcohol (10 to 24 carbon atoms) sulfate ester metal salts (e.g., sodium lauryl sulfate), ethoxylated tetramethyldecynediol, sodium sulfoethyl methacrylate, dimethylaminomethyl methacrylate, and the like. Polyvinyl alcohol, polyvinylpyrrolidone or the like may be further added as a stabilizer.

The monomer concentration of the solution or dispersion is usually 5 to 95% by mass, and the use amount of the polymerization initiator is usually 0.01 to 5%, based on the total mass of the monomers, and is preferably 0.05 to 2%, from the viewpoint of adhesion and cohesion.

In the polymerization, a known chain transfer agent, e.g., a mercapto compound (dodecylmercaptan, n-butylmercaptan, etc.) and a halogenated hydrocarbon (carbon tetrachloride, carbon tetrabromide, benzyl chloride, etc.) can be used. The use amount is usually 2% or less, based on the total mass of the monomers, and is preferably 0.5% or less, from the viewpoint of adhesion and cohesion.

In addition, the system temperature in the polymerization reaction is usually −5 to 150° C., and preferably 30 to 120° C., the reaction time is usually 0.1 to 50 hours, and preferably 2 to 24 hours, and the end point of the reaction can be confirmed by that the amount of unreacted monomers is usually 5% by mass or less, and preferably 1% by mass or less of the total amount of the used monomers.

The vinyl resin (A) may be a cross-linked polymer obtained by crosslinking the polymer (A1) with a polyepoxy compound (a'1) and/or a polyol compound (a'2).

In the cross-linked polymer, it is desirable to crosslink the polymer (A1) using a crosslinking agent (A') having a reactive functional group that reacts with an active hydrogen such as a carboxyl group in the polymer (A1), and a polyepoxy compound (a'1) and/or a polyol compound (a'2) is desirably used as the crosslinking agent (A').

The polyepoxy compound (a'1) includes those having an epoxy equivalent of 80 to 2,500, for example, glycidyl ethers [bisphenol A diglycidyl ether, bisphenol F diglycidyl ether, pyrogallol triglycidyl ether, ethylene glycol diglycidyl ether, propylene glycol diglycidyl ether, neopentyl glycol diglycidyl ether, trimethylolpropane triglycidyl ether, glycerol triglycidyl ether, polyethylene glycol (Mw 200 to 2,000) diglycidyl ether, polypropylene glycol (Mw 200 to 2,000) diglycidyl ether, diglycidyl ether of 1 to 20 mol alkylene oxide adduct of bisphenol A, etc.]; glycidyl esters (diglycidyl phthalate, triglycidyl trimellitate, diglycidyl dimerate, diglycidyl adipate, etc.); glycidyl amines (N,N-diglycidylaniline, N,N-diglycidyl toluidine, N,N,N',N'-tetraglycidyl diaminodiphenylmethane, N,N,N',N'-tetraglycidyl xylylenediamine, 1,3-bis(N,N-diglycidylaminomethyl)cyclohexane, N,N,N',N'-tetraglycidyl hexamethylenediamine, etc.); aliphatic epoxides (epoxidized polybutadiene, epoxidized soybean oil, etc.); and alicyclic epoxides (limonene dioxide, dicyclopentadiene dioxide, etc.).

The polyol compound (a'2) includes low molecular weight polyhydric alcohols {aliphatic and alicyclic diols having 2 to 20 carbon atoms [ethylene glycol (hereinafter abbreviated as EG), diethylene glycol (hereinafter abbreviated as DEG), propylene glycol, 1,3-butylene glycol, 1,4-butanediol (hereinafter abbreviated as 14BG), 1,6-hexanediol, 3-methylpentanediol, neopentyl glycol, 1,9-nonanediol, 1,4-dihydroxycyclohexane, 1,4-bis(hydroxymethyl)cyclohexane, 2,2-bis(4,4'-hydroxycyclohexyl)propane, etc.]; aromatic ring-containing diols having 8 to 15 carbon atoms [m- and p-xylylene glycol, 1,4-bis(hydroxyethyl)benzene, etc.]; triols having 3 to 8 carbon atoms (glycerol, trimethylolpropane, etc.); tetravalent or higher valent polyhydric alcohols [pentaerythritol, α-methyl glucoside, sorbitol, xylitol, mannitol, glucose, fructose, sucrose, dipentaerythritol, polyglycerols (polymerization degree of 2 to 20), etc.] etc.}, and these alkylene (2 to 4 carbon atoms) oxide adducts (polymerization degree of 2 to 30), and the like.

As the use amount of the crosslinking agent (A'), the equivalent ratio of the active hydrogen-containing group in the polymer (A1) to the reactive functional group in the crosslinking agent (A') is preferably 1:0.01 to 2, and further preferably 1:0.02 to 1, from the viewpoint of liquid absorption of the electrolyte solution.

The method for crosslinking the polymer (A1) using the crosslinking agent (A') includes a method of coating a lithium ion battery active material with a coating resin comprising the polymer (A1) and then crosslinking it. Specifically, the method includes a method of producing a coated active material in which a lithium ion battery active material is coated with a resin by mixing a lithium ion battery active material and a resin solution containing the polymer (A1) and removing a solvent, then mixing a solution containing a crosslinking agent (A') to the coated active material and heating the mixture, thereby causing solvent removal and a crosslinking reaction, and coating the lithium ion battery active material with a crosslinked polymer.

The heating temperature is desirably 70° C. or more in the case of using a polyepoxy compound (a'1) as a crosslinking agent, and desirably 120° C. or more in the case of using a polyol compound (a'2).

The urethane resin (B) is a resin obtained by reacting an active hydrogen component (b1) and an isocyanate component (b2).

As the active hydrogen component (b1), it is desirable to contain at least one selected from the group consisting of polyether diol, polycarbonate diol, and polyester diol.

The polyether diol includes polyoxyethylene glycol (hereinafter abbreviated as PEG), polyoxyethylene oxypropylene block copolymer diol, polyoxyethylene oxytetramethylene block copolymer diol; ethylene oxide adducts of low molecular weight glycols such as ethylene glycol, propylene glycol, 1,4-butanediol, 1,6-hexamethylene glycol, neopentyl glycol, bis(hydroxymethyl)cyclohexane, 4,4'-bis(2-hydroxyethoxy)-diphenylpropane; condensed polyether ester diols obtained by reacting PEG having a number average molecular weight of 2,000 or less, with one or more dicarboxylic acids [aliphatic dicarboxylic acids having 4 to 10 carbon atoms (e.g., succinic acid, adipic acid, sebacic acid, etc.), aromatic dicarboxylic acids having 8 to 15 carbon atoms (e.g., terephthalic acid, isophthalic acid, etc.) etc.]; and mixtures of two or more thereof.

In the case where an oxyethylene unit is contained in the polyether diol, the content of the oxyethylene unit is preferably 20% by mass, more preferably 30% by mass or more, and further preferably 40% by mass or more.

Also, the polyether diol includes polyoxypropylene glycol, polyoxytetramethylene glycol (hereinafter abbreviated as PTMG), polyoxypropylene oxytetramethylene block copolymer diol, and the like.

Among them, PEG, polyoxyethylene oxypropylene block copolymer diol and polyoxyethylene oxytetramethylene block copolymer diol are preferred, and PEG is particularly preferred.

Also, only one kind of polyether diol may be used, and a mixture of two or more thereof may be used.

Examples of the polycarbonate diol include polyhexamethylene carbonate diol.

The polyester diol includes condensed polyester diols obtained by reacting a low molecular weight diol and/or a polyether diol having a number average molecular weight of 1,000 or less with one or more dicarboxylic acid described above, polylactone diols obtained by ring-opening polymerization of a lactone having 4 to 12 carbon atoms, and the like. The low molecular weight diol includes the low molecular weight glycols exemplified in the section of polyether diol, and the like. The polyether diol having a number average molecular weight of 1,000 or less includes polyoxypropylene glycol, PTMG, and the like. Examples of the lactone include ε-caprolactone, γ-valerolactone, and the like. Specific examples of the polyester diol include polyethylene adipate diol, polybutylene adipate diol, polyneopentylene adipate diol, poly(3-methyl-1,5-pentylene adipate)diol, polyhexamethylene adipate diol, polycaprolactone diol, and mixtures of two or more thereof.

Also, the active hydrogen component (b1) may be a mixture of two or more of polyether diol, polycarbonate diol, and polyester diol described above.

It is desirable that the active hydrogen component (b1) contains a high molecular weight diol (b11) having a number average molecular weight of 2,500 to 15,000 as an essential component. The high molecular weight diol (b11) includes polyether diol, polycarbonate diol, and polyester diol described above.

The high molecular weight diol (b11) having a number average molecular weight of 2,500 to 15,000 is preferable since the hardness of urethane resin (B) is moderately soft, and the strength of coating formed on the active material is strong.

Also, the number average molecular weight of the high molecular weight diol (b11) is more desirably 3,000 to 12,500, and further desirably 4,000 to 10,000.

The number average molecular weight of the high molecular weight diol (b11) can be calculated from the hydroxyl value of the high molecular weight diol.

Also, the hydroxyl value can be measured according to the description of JIS K1557-1 (2007).

Moreover, it is desirable that the active hydrogen component (b1) contains a high molecular weight diol (b11) having a number average molecular weight of 2,500 to 15,000 as an essential component, and the solubility parameter (SP value) of the high molecular weight diol (b11) is 8.0 to 12.0 $(cal/cm^3)^{1/2}$. The SP value of the high molecular weight diol (b11) is more desirably 8.5 to 11.5 $(cal/cm^3)^{1/2}$, and further desirably 9.0 to 11.0 $(cal/cm^3)^{1/2}$. When the SP value of the high molecular weight diol (b11) is 8.0 to 12.0 $(cal/cm^3)^{1/2}$, it is preferable in terms of liquid absorption of the electrolyte solution of the urethane resin (B).

Moreover, it is desirable that the active hydrogen component (b1) contains a high molecular weight diol (b11) having a number average molecular weight of 2,500 to 15,000 as an essential component, and the content of the high molecular weight diol (b11) is 20 to 80% by mass, based on the mass of the urethane resin (B). The content of the high molecular weight diol (b11) is more desirably 30 to 70% by mass, and further desirably 40 to 65% by mass.

When the content of the high molecular weight diol (b11) is 20 to 80% by mass, it is preferable in terms of liquid absorption of the electrolyte solution of the urethane resin (B).

Also, it is desirable the active hydrogen component (b1) has a high molecular weight diol (b11) having a number average molecular weight of 2,500 to 15,000 and a chain extending agent (b13) as essential components.

Examples of the chain extending agent (b13) include low molecular weight diols having 2 to 10 carbon atoms [e.g., EG, propylene glycol, 14BG, DEG, 1,6-hexamethylene glycol, etc.]; diamines [aliphatic diamines having 2 to 6 carbon atoms (e.g., ethylene diamine, 1,2-propylene diamine, etc.), alicyclic diamines having 6 to 15 carbon atoms (e.g., isophoronediamine, 4,4'-diaminodicyclohexylmethane, etc.), aromatic diamines having 6 to 15 carbon atoms (e.g., 4,4'-diaminodiphenylmethane, etc.) etc.]; monoalkanolamines (e.g., monoethanolamine, etc.); hydrazines or derivatives thereof (e.g., adipic acid dihydrazide, etc.) and mixtures of two or more thereof. Among them, preferred are low molecular weight diols, and particularly preferred are EG, DEG, and 14BG.

As the combination of the high molecular weight diol (b11) and the chain extending agent (b13), a combination of PEG as the high molecular weight diol (b11) and EG as the chain extending agent (b13), or a combination of polycarbonate diol as the high molecular weight diol (b11) and EG as the chain extending agent (b13) is preferable.

Moreover, it is desirable that the active hydrogen component (b1) contains a high molecular weight diol (b11) having a number average molecular weight of 2,500 to 15,000, a diol (b12) other than the high molecular weight diol (b11) and a chain extending agent (b13), and the equivalent ratio of (b11) to (b12) {(b11)/(b12)} is 10/1 to 30/1, and the equivalent ratio of (b11) to the total equivalent of (b12) and (b13) {(b11)/[(b12)+(b13)]} is 0.9/1 to 1.1/1.

Also, the equivalent ratio of (b11) to (b12) {(b11)/(b12)} is more desirably 13/1 to 25/1, and further desirably 15/1 to 20/1.

The diol (b12) other than the high molecular weight diol (b11) is not particularly limited, as long as it is a diol and not contained in the high molecular weight diol (b11) described above, and specific examples include diols having a number average molecular weight of less than 2,500 and diols having a number average molecular weight of more than 15,000.

The kind of the diol includes polyether diol, polycarbonate diol, and polyester diol described above, and the like.

The low molecular diol weight having 2 to 10 carbon atoms contained in the chain extending agent (b13) that is a diol other than the high molecular weight diol (b11) is not contained in the diol (b12) other than the high molecular weight diol (b11).

As the isocyanate component (b2), one conventionally used in polyurethane production can be used. The above isocyanates include aromatic diisocyanates having 6 to 20 carbon atoms (except for carbon in the NCO group, the same applies hereafter), aliphatic diisocyanates having 2 to 18 carbon atoms, alicyclic diisocyanates having 4 to 15 carbon atoms, araliphatic diisocyanates having 8 to 15 carbon atoms, modified products of these diisocyanates (carbodiimide modified product, urethane modified product, uretdione modified product, etc.), and mixtures of two or more thereof.

Specific examples of the aromatic diisocyanates include 1,3- and/or 1,4-phenylene diisocyanate, 2,4- and/or 2,6-tolylene diisocyanate, 2,4'- and/or 4,4'-diphenylmethane diisocyanate (hereinafter, diphenylmethane diisocyanate is abbreviated as MDI), 4,4'-diisocyanatobiphenyl, 3,3'-dimethyl-4,4'-diisocyanatobiphenyl, 3,3'-dimethyl-4,4'-diisocyanatodiphenylmethane, 1,5-naphthylene diisocyanate, and the like.

Specific examples of the aliphatic diisocyanates include ethylene diisocyanate, tetramethylene diisocyanate, hexamethylene diisocyanate, dodecamethylene diisocyanate, 2,2,4-trimethylhexamethylene diisocyanate, lysine diisocyanate, 2,6-diisocyanatomethylcaproate, bis(2-isocyanatoethyl)carbonate, 2-isocyanatoethyl-2,6-diisocyanatohexanoate, and the like.

Specific examples of the alicyclic diisocyanates include isophorone diisocyanate, dicyclohexylmethane-4,4'-diisocyanate, cyclohexylene diisocyanate, methylcyclohexylene diisocyanate, bis(2-isocyanatoethyl)-4-cyclohexylene-1,2-dicarboxylate, 2,5- and/or 2,6-norbornane diisocyanate, and the like.

Specific examples of the araliphatic diisocyanates include m- and/or p-xylylene diisocyanate, α,α,α',α'-tetramethylxylylene diisocyanate, and the like.

Among them, preferred are aromatic diisocyanates and alicyclic diisocyanates, further preferred are aromatic diisocyanates, and particularly preferred is MDI.

When the urethane resin (B) contains a high molecular weight diol (b11) and an isocyanate component (b2), the equivalent ratio of (b2)/(b11) is preferably 10 to 30/1, and more preferably 11 to 28/1. When the ratio of the isocyanate component (b2) exceeds 30 equivalent, it becomes a hard coating film.

Also, when the urethane resin (B) contains a high molecular weight diol (b11), a chain extending agent (b13) and an isocyanate component (b2), the equivalent ratio of (b2)/[(b11)+(b13)] is usually 0.9 to 1.1/1, and preferably 0.95 to 1.05/1. Outside this range, the urethane resin may not have sufficiently high molecular weight.

The number average molecular weight of the urethane resin (B) is desirably 40,000 to 500,000, and more desirably 50,000 to 400,000. When the number average molecular weight of the urethane resin (B) is less than 40,000, the strength of coating is lowered, and more than 500,000, the solution viscosity is increased, and uniform coating film may not be obtained.

The number average molecular weight of the urethane resin (B) is measured by GPC (gel permeation chromatography) using DMF as a solvent, and using polyoxypropylene glycol as a standard material. The sample concentration is 0.25% by mass, the column stationary phase is formed by connecting each one of TSKgel SuperH2000, TSKgel SuperH3000, and TSKgel SuperH4000 (all manufactured by Tosoh Corporation), and the column temperature is 40° C.

The urethane resin (B) can be produced by reacting an active hydrogen component (b1) with an isocyanate component (b2).

Examples of the method include, using a high molecular weight diol (b11) and a chain extending agent (b13) as active hydrogen components (b1), a one-shot method in which an isocyanate component (b2), a high molecular weight diol (b11) and a chain extending agent (b13) are simultaneously reacted, and a prepolymer method in which a high molecular weight diol (b11) and an isocyanate component (b2) are reacted in advance, and then subsequently a chain extending agent (b13) is reacted.

Also, the urethane resin (B) can be produced in the presence or absence of a solvent inert to an isocyanate group. The appropriate solvent in the case of producing the urethane resin (B) in the presence of a solvent includes amide-based solvents [dimethylformamide (hereinafter abbreviated as DMF), dimethylacetamide, N-methyl-2-pyrrolidone (hereinafter abbreviated as NMP), etc.], sulfoxide-based solvents (dimethylsulfoxide, etc.), ketone-based solvents [methyl ethyl ketone, methyl isobutyl ketone, etc.], aromatic-based solvents (toluene, xylene, etc.), ether-based solvents (dioxane, tetrahydrofuran, etc.), ester-based solvents (ethyl acetate, butyl acetate, etc.), and mixtures of two or more thereof. Among them, preferred are amide-based solvents, ketone-based solvents, aromatic-based solvents, and mixtures of two or more thereof.

In the production of the urethane resin (B), the reaction temperature may be the same as the temperature usually employed in the urethanized reaction, and is usually 20 to 100° C. when using a solvent, and is usually 20 to 220° C. when using no solvent.

In order to promote the reaction, a catalyst usually used in a polyurethane reaction [e.g., amine-based catalysts (triethylamine, triethylenediamine, etc.), tin-based catalysts (dibutyltin dilaurate, etc.)] can be used, as necessary.

In addition, a polymerization terminator [e.g., monovalent alcohols (ethanol, isopropanol, butanol, etc.), monovalent amines (dimethylamine, dibutylamine, etc.) etc.] also can be used, as necessary.

The urethane resin (B) can be produced by the production apparatus usually employed in this field. In addition, when a solvent is not used, a production apparatus such as a kneader or extruder can be used. The urethane resin (B) produced as described above has a solution viscosity measured as a 30% by mass (solid content) DMF solution of usually 10 to 10,000 poises/20° C., and practically preferably 100 to 2,000 poises/20° C.

The polyester resin (C) includes a polycondensate of a polyol and a polycarboxylic acid, and the like.

The polyol includes diols (c1) and trivalent or more polyols (c2), and the polycarboxylic acid includes dicarboxylic acids (c3) and trivalent or more polycarboxylic acids (c4). Among them, non-linear polyester resins using a trivalent or more polyol (c2) and/or trivalent or more polycarboxylic acid (c4), together with a diol (c1) and a dicarboxylic acid (c3), are preferable, and polyester resins comprising four components (c1), (c2), (c3) and (c4) are particularly preferable.

The diol (c1) includes alkylene glycols (ethylene glycol, 1,2-propylene glycol, 1,3-propylene glycol, 1,4-butanediol, 1,6-hexanediol, dodecanediol, etc.); alkylene ether glycols (diethylene glycol, triethylene glycol, dipropylene glycol, polyoxyethylene glycol, polyoxypropylene glycol, polyoxytetramethylene ether glycol, etc.); alicyclic diols (1,4-cyclohexanedimethanol, hydrogenated bisphenol A, hydrogenated bisphenol F, etc.); bisphenols (bisphenol A, bisphenol F, bisphenol S, etc.); alkylene oxide (ethylene oxide, propylene oxide, butylene oxide, styrene oxide, α-olefin oxide, etc.) adduct of the above alicyclic diols; alkylene oxide (ethylene oxide, propylene oxide, butylene oxide, styrene oxide, α-olefin oxide, etc.) adduct of the above bisphenols, and the like. Among them, preferred are alkylene glycols having 6 or more carbon atoms, alkylene oxide adducts of bisphenols, and alicyclic diols, and particularly preferred are propylene oxide, butylene oxide, styrene oxide and α-olefin oxide adducts of bisphenols, alkylene glycols having 8 or more carbon atoms, hydrogenated bisphenol A, hydrogenated bisphenol F, and combined use thereof.

The trivalent or more polyol (c2) includes trivalent to octavalent or more polyhydric aliphatic alcohols (glycerol, trimethylolethane, trimethylolpropane, pentaerythritol, sorbitol, etc.); trisphenols (trisphenol PA, etc.); novolac resins (phenol novolac, cresol novolac, etc.); alkylene oxide adducts of the above trisphenols; alkylene oxide adducts of the above novolac resins, and the like. Among them, preferred are trivalent to octavalent or more polyhydric aliphatic alcohols and alkylene oxide adducts of novolac resins, and particularly preferred are alkylene oxide adducts of novolac resins.

The dicarboxylic acid (c3) includes alkylenedicarboxylic acids (succinic acid, adipic acid, azelaic acid, sebacic acid, dodecane dicarboxylic acid, octadecane dicarboxylic acid, dodecenylsuccinic acid, pentadecenylsuccinic acid, octadecenylsuccinic acid, dimer acid, etc.); alkenylenedicarboxylic acids (maleic acid, fumaric acid, etc.); aromatic dicarboxylic acids (phthalic acid, isophthalic acid, terephthalic acid, naphthalene dicarboxylic acid, etc.); and the like. Among them, preferred are alkylenedicarboxylic acids having 6 to 50 carbon atoms, alkenylenedicarboxylic acids having 6 to 50 carbon atoms, aromatic dicarboxylic acids having 8 to 20 carbon atoms and combined use thereof, further preferred are alkylenedicarboxylic acids having 7 to 50 carbon atoms, and combined use of these and aromatic dicarboxylic acids having 8 to 20 carbon atoms, and particularly preferred are alkenyl succinic acids having 16 to 50 carbon atoms, and combined use of these and aromatic dicarboxylic acids having 8 to 20 carbon atoms.

Examples of the trivalent or more polycarboxylic acids (c4) include aromatic polycarboxylic acids having 9 to 20 carbon atoms (trimellitic acid, pyromellitic acid, etc.), vinyl polymers of unsaturated carboxylic acids (styrene/maleic acid copolymer, styrene/acrylic acid copolymer, α-olefin/maleic acid copolymer, styrene/fumaric acid copolymer, etc.), and the like. Among them, preferred are aromatic polycarboxylic acids having 9 to 20 carbon atoms, and particularly preferred is trimellitic acid.

Here, as the dicarboxylic acid (c3) or trivalent or more polycarboxylic acid (c4), an acid anhydride or lower alkyl ester (methyl ester, ethyl ester, isopropyl ester, etc.) of the above may be used.

Also, a hydroxycarboxylic acid (c5) can be copolymerized together with (c1), (c2), (c3) and (c4). The hydroxycarboxylic acid (c5) includes hydroxystearic acid, a hardened castor oil fatty acid, and the like.

As the ratio of the polyol and the polycarboxylic acid, the equivalent ratio [OH]/[COOH] of a hydroxyl group [OH] to a carboxyl group [COOH] is usually 2/1 to 1/2, preferably 1.5/1 to 1/1.5, and further preferably 1.3/1 to 1/1.3. As the ratio of the trivalent or more polyol (c2) and the trivalent or more polycarboxylic acid (c4), the sum of mol numbers of (c2) and (c4) is usually 0 to 40% by mol, preferably 3 to 25% by mol, and further preferably 5 to 20% by mol, relative to the total of mol numbers of (c1) to (c4). The molar ratio of (c2) to (c3) is usually 0/100 to 100/0, preferably 80/20 to 20/80, and further preferably 70/30 to 30/70.

It is preferable that the polyester resin (C) has a number average molecular weight of 2,000 to 50,000, from the viewpoint of liquid absorption of the electrolyte solution.

The number average molecular weight of the polyester resin (C) is measured by GPC (gel permeation chromatography). The conditions of GPC used in the measurement of the number average molecular weight of the polyester resin (C) are, for example, as follows.

Apparatus: HLC-8220GPC (liquid chromatograph manufactured by Tosoh Corporation)

Column: TSK gel Super H4000+TSK gel Super H3000+ TSK gel Super H2000 (all manufactured by Tosoh Corporation)

Column temperature: 40° C.
Detector: RI (Refractive Index)
Solvent: Tetrahydrofuran
Flow rate: 0.6 ml/min
Sample concentration: 0.25% by mass
Injection amount: 10 µl
Standard: Polystyrene (manufactured by Tosoh Corporation; TSK STANDARD POLYSTYRENE)

The polyester resin (C) is obtained by heating a polycarboxylic acid and a polyol to 150 to 280° C., in the presence of a known esterifying catalyst such as tetrabutoxy titanate or dibutyltin oxide, and subjecting it to dehydration condensation. It is also effective to reduce pressure for improving the reaction rate at the terminal stage of the reaction.

The polyamide resin (D) is not particularly limited, and is desirably a resin obtained by condensation polymerization of a polymerized fatty acid (d1) containing at least 40% by mass of tribasic acid having 54 carbon atoms, an aliphatic monocarboxylic acid (d2) having 2 to 4 carbon atoms, and a polyamine (d3) comprising ethylene diamine and an aliphatic polyamine having 3 to 9 carbon atoms.

Examples of the polymerized fatty acid (d1) include a residue after polymerizing an unsaturated fatty acid such as oleic acid or linoleic acid or the lower alkyl ester (1 to 3 carbon atoms) thereof, then collecting a dibasic acid component having 36 carbon atoms with high utility value, also called a trimer acid, for example, those having the following compositions.

Monobasic acid having 18 carbon atoms: 0 to 5% by mass (preferably 0 to 2% by mass)

Dibasic acid having 36 carbon atoms: less than 60% by mass (preferably less than 50% by mass)

Tribasic acid having 54 carbon atoms: 40% by mass or more (preferably 50% by mass or more)

Also, a part of the (d1) may be replaced with other tribasic acid or tetrabasic acid, as necessary. The other tribasic acid or tetrabasic acid includes trimellitic acid, pyromellitic acid, benzophenonetetracarboxylic acid, butanetetracarboxylic acid (including acid anhydride and alkyl esters having 1 to 3 carbon atoms thereof), and the like.

The aliphatic monocarboxylic acid (d2) having 2 to 4 carbon atoms includes acetic acid, propionic acid and butylic acid, and these can be used alone or mixed at an arbitrary ratio and used.

The use amount of (d2) is usually 20 to 40 equivalent %, and preferably 30 to 40 equivalent %, relative to the total carboxylic acid components [(d1)+(d2)].

The aliphatic polyamine having 3 to 9 carbon atoms constituting the polyamine (d3) includes diethylenetriamine, propylenediamine, diaminobutane, hexamethylenediamine, trimethylhexamethylenediamine, iminobispropylamine, methyliminobispropylamine, and the like. The (d3) is a mixture of ethylene diamine and one or more aliphatic polyamine having 3 to 9 carbon atoms, and the ratio of ethylene diamine to the (d3) is usually 60 to 85 equivalent %, and preferably 70 to 80 equivalent %.

The number average molecular weight of the polyamide resin (D) is usually 3,000 to 50,000, and preferably 5,000 to 10,000.

The number average molecular weight of the polyamide resin (D) can be determined by a gel permeation chromatography (hereinafter, abbreviated as GPC) measurement, in the following conditions.

Apparatus: HLC-802A (manufactured by Tosoh Corporation)

Column: Two columns of TSK gel GMH6 (manufactured by Tosoh Corporation)

Measurement temperature: 40° C.
Sample solution: 0.25% by mass DMF solution
Injection amount of solution: 200 μl
Detection apparatus: Refractive index detector
Herein, the molecular weight calibration curve was made using a standard polystyrene.

The melting point of the polyamide resin (D) by a trace amount melting point measurement method is preferably 100 to 150° C., and more preferably 120 to 130° C., from the viewpoint of heat resistance of a battery.

The polyamide resin (D) can be produced by the same method as the production method of a usual polymerized fatty acid polyamide resin. The reaction temperature of amidation polycondensation is usually 160 to 250° C., and preferably 180 to 230° C. It is preferred to carry out the reaction in an inert gas such as nitrogen gas for preventing coloration, and the reaction may be carried out under reduced pressure at the terminal stage of the reaction, for promoting completion of the reaction or removal of a volatile component. Also, after the amidation polycondensation, the reaction product can be diluted with an alcoholic solvent such as methanol, ethanol or isopropanol to obtain a solution-like liquid.

Examples of the other resins (E) include epoxy resins, polyimide resins, silicone resins, phenol resins, melamine resins, urea resins, aniline resins, ionomer resins, polycarbonates, and the like.

Specific kind of the conductive material 1e contained in the base material in the shell part 1s and the form of containing it are not particularly limited, and the conductive material 1e may have a form that can form a conductive path from the core part 1c to the surface of the electrode material (surface of the shell part 1s).

Examples of the kind of the conductive material 1e include metals such as aluminum, stainless steel (SUS), silver, gold, copper, and titanium; carbon materials such as graphite, carbon black such as acetylene black, Ketjen black, furnace black, channel black and thermal lamp black, carbon nanotube (CNT), carbon fiber (e.g., vapor grown carbon fiber (VGCF)), carbon nanophone, and carbon nanofiber; mixtures thereof; and the like, but are not limited thereto.

These conductive materials may be used singly, or may be used in combination of two or more kinds. Also, an alloy or metal oxide thereof may be used. From the viewpoint of electrical stability, preferred are aluminum, stainless steel, silver, gold, copper, titanium and carbon materials, further preferred are silver, gold, aluminum, stainless steel, and carbon materials, and particularly preferred are carbon materials. Particularly, the conductive material is one or more carbon materials selected from graphite, acetylene black, Ketjen black, furnace black, channel black, thermal lamp black, carbon nanotube, vapor grown carbon fiber (VGCF), carbon nanophone, and carbon nanofiber.

When the conductive material 1e is a metal, the form of containing the conductive material 1e may be such as to be obtained by coating the periphery of a particle-based ceramic material or a resin material with a conductive material by plating or the like.

As to the form of containing the conductive material 1e, when the conductive material 1e is acetylene black or a material that can have a fibrous structure such as carbon fiber, it is preferred that the surface of the electrode active material constituting the core part 1c and the surface of the electrode material (surface of the shell part 1s) are electrically conducted via the conductive material 1e, as shown in FIG. 2.

The average particle diameter of the conductive material is not particularly limited, but is preferably about 0.01 to 10 μm, from the viewpoint of electric characteristics of a battery. The "particle diameter" herein refers to the maximum distance L between any two points in a contour line of a particle. A value of the "average particle diameter" is employed from a value calculated as an average value of the particle diameter of the particle observed in several to several ten fields using observation means such as scanning electron microscopy (SEM) or transmission electron microscopy (TEM).

The ratio of the gel-forming polymer and the conductive material contained in the shell part is not also particularly limited, but as an example, a mixing ratio of the gel-forming polymer and the conductive material (gel-forming polymer: conductive material) by mass ratio is preferably 8:2 to 2:8. Within the above range, it is possible to form a sufficient conductive path, and the effect of improving the energy density of a battery is high. Also, adhesion with the electrode material is high, and a stable interface between the electrode material and the electrolyte can be formed. The value of ratio of these contents is calculated as the average value of the value measured for 50 or more core-shell-type electrode active material.

As described above, according to the non-aqueous electrolyte secondary battery according to this embodiment, as the electrode active material, a core-shell-type electrode material in which the surface of the core part 1c is coated with a shell part 1s including a conductive material in a base material formed by a gel-forming polymer having a liquid absorption rate with respect to the electrolyte solution of 10 to 200% is used. Therefore, the interface between the electrode active material and the electrolyte is stabilized, and the effect of improving the energy density of a battery, particularly, improving the initial coulomb efficiency is obtained.

(Method for Producing Core-Shell-Type Electrode Material)

The method for producing a core-shell-type electrode material is not particularly limited, and any techniques may be preferably employed as long as the method includes a coating step of coating a core part including an electrode active material, with a shell part including a conductive material in a base material formed by a gel-forming polymer having a liquid absorption rate with respect to the electrolyte solution of 10 to 200%. For example, the following four techniques are exemplified.

(1) Stirring Desolvation Method

In this method, a resin solution containing a gel-forming polymer is charged while stirring, in the presence of an electrode active material, then a conductive material is added thereto, and a solvent is removed therefrom while stirring.

Hereinafter, these steps will be described.

First, a resin solution containing a gel-forming polymer is charged while stirring, in the presence of an electrode active material. Accordingly, the resin solution can be adhered around the electrode active material.

The kind of the solvent that can be used in the resin solution is different depending on the kind of the gel-forming polymer, and examples include amide-based solvents [dimethylformamide (hereinafter abbreviated as DMF), dimethylacetamide, N-methyl-2-pyrrolidone (hereinafter abbreviated as NMP), etc.], sulfoxide-based solvents (dimethylsulfoxide, etc.), ketone-based solvents [methyl ethyl ketone, methyl isobutyl ketone, etc.], hydrocarbon-based solvents (n-hexane, cyclohexane, toluene, xylene, etc.), ether-based solvents (dioxane, tetrahydrofuran, etc.), ester-based solvents (ethyl acetate, butyl acetate, etc.), alcoholic solvents (e.g., methanol, ethanol, isopropanol (hereinafter abbreviated as IPA), octanol, etc.), water, and mixtures of two or more thereof.

The resin solution can be prepared by a method of charging a gel-forming polymer to the solvent and stirring the mixture, or the like, and the preparation method is not particularly limited.

The viscosity of the resin solution (25° C.) is preferably 100 to 10,000 mPa·s, from the viewpoint of uniformly coating the electrode active material with the resin solution.

Herein, the viscosity of the resin solution is the numerical value measured using a B-type viscometer, rotor No. 7, in the conditions of 25° C., 6 rotations/min.

The ratio of the resin solid content in the resin solution is preferably 5 to 40% by mass, and particularly preferably 10 to 40% by mass, from the viewpoint of securing proper viscosity.

The resin solution is charged while stirring, so that the resin solution can be coated onto the whole electrode active material.

The stirring conditions are not particularly limited, but it is desirable to stir the solution at a rotation speed of 30 to 500 rpm.

The apparatus for stirring includes a stirrer, a universal mixer, a planetary mixer, and the like.

The charging speed of the resin solution is not particularly limited, but it is desirable to charge the solution little by little. Accordingly, the resin solution is prevented from locally adhering to the electrode active material, thus the resin solution can be coated onto the whole electrode active material.

The method of charging the resin solution includes the methods such as dropping and injection.

As the method of charging the resin solution based on the above conditions, for example, a method of adding dropwise a resin solution having a ratio of the resin solid content of 10 to 40% by mass, over 1 to 90 minutes, and the like.

The charge amount of the resin solution can be set considering the solid content mass of the gel-forming polymer contained in the resin solution, and the solid content mass of the gel-forming polymer is desirably 0.5 to 10% by mass, more desirably 0.8 to 5% by mass, and further desirably 1 to 3% by mass, relative to 100% by mass of the electrode active material.

Also, it is desirable that the ratio (V/S) of volume V (cm$^3$) of the resin solution to the specific surface area S (cm$^2$/g) of the electrode active material is 1/1 to 100/1, from the viewpoint of uniformly coating the electrode active material with the resin solution.

Herein, the specific surface area of the electrode active material refers to BET specific surface area.

Next, a conductive material is added.

Accordingly, the conductive material can be further adhered around the electrode active material to which the resin solution is adhered. The conductive material is added after charging the resin solution, thereby preventing the conductive materials from aggregating each other, thus the conductive material can be adhered to the whole electrode active material.

The detail of the conductive material is as described above.

The amount of the conductive material to be added is desirably 0.5 to 10% by mass, more desirably 0.8 to 8% by mass, and further desirably 1 to 5% by mass, relative to 100% by mass of the electrode active material.

It is desirable that the conductive material is charged while continuing stirring.

Subsequently, a solvent is removed while stirring.

Accordingly, a core-shell-type electrode material from which the solvent is removed from the surface can be obtained.

The method for removing the solvent includes a method of heat-drying the electrode active material coated with the resin solution after adding the conductive material, a method of vacuum-drying the electrode active material coated with the resin solution after adding the conductive material, a method of freeze-drying the electrode active material coated with the resin solution after adding the conductive material, combinations of these methods, and the like.

The condition of removing the solvent is not particularly limited, and for example, it is preferred that the conductive material is added, then the temperature is increased to 50 to 200° C. while stirring the mixture, and the pressure is reduced to 0.007 to 0.04 MPa, then retained for 10 to 150 minutes to remove the solvent.

Also, the coated electrode active material may be pulverized after removing the solvent. Accordingly, the aggregated particles can be pulverized. The method of pulverization is not particularly limited, and is preferably dry type or wet type. The dry-type pulverization includes a jet mill and the like. The wet-type pulverization includes a high-speed shearing disperser, a sand grinder, a bead mill, and the like.

By the above steps, a core-shell-type electrode material in which at least a part of the surface of the electrode active material is coated with a coating agent containing a gel-forming polymer and a conductive material can be produced.

(2) Poor Solvent Precipitation Method

In this method, first, a gel-forming polymer as a base material constituting the shell part is dissolved in a good solvent (in a case where the gel-forming polymer is the vinyl resin described above, for example, isopropanol (IPA), and in a case where the gel-forming polymer is the polyurethane resin, for example, N,N-dimethylformamide (DMF)). Next, a powder of an electrode active material is dispersed in the solution, then a poor solvent of the gel-forming polymer (in a case where the gel-forming polymer is the vinyl resin described above, for example, water, and in a case where the gel-forming polymer is the polyurethane resin, for example, IPA) is added to the solution. In this method, the gel-forming polymer is precipitated on the surface of the electrode active material based on the amount of the poor solvent added and the coating of the electrode active material with the gel-forming polymer is achieved. As necessary, the addition of the poor solvent may be separately performed in plural times, or the poor solvent can also be contained in the original solution. At this time, when a conductive material is dispersed in a poor solvent to be added at any time of addition of the poor solvent, the conductive material can be contained in advance in the gel-forming polymer to be precipitated, and thus a core-shell-type electrode material as illustrated in FIG. 2 can be obtained. Incidentally, the above-described operation may be repeated in such a manner that the solid content is filtered by a technique such as filtration under reduced pressure after a predetermined amount of the shell part is formed, and then the filtered solid content is dissolved in the above-described good solvent. At this time, the distribution of the conductive material in the shell part can also be controlled to have a desired form by differentiating the amount (concentration) of the conductive material to be contained in the gel-forming polymer to be precipitated.

(3) Sugar Coating Method (Simple Spray Drying Method)

In this method, first, a solution is prepared by dissolving a conductive material and a gel-forming polymer in a good solvent of the gel-forming polymer. Next, the obtained solution is sprayed on the surface of an electrode active material, and then, as necessary, drying treatment is carried out under stirring. Thus, it is possible to obtain a core-shell-type electrode material as illustrated in FIG. 2 by means of the simple technique.

(4) Solid Pulverizing Method

In this method, a solution is prepared by dissolving an electrode active material, a conductive material, and a gel-forming polymer in a good solvent of the gel-forming polymer. Next, this solution is spread on, for example, a tray, and is dried at a temperature of about 60 to 100° C. so as to evaporate the solvent. In this way, the obtained solid content is pulverized to have a desired particle diameter, and, as necessary, screening is carried out. Even in such a technique, it is possible to obtain a core-shell-type electrode material as illustrated in FIG. 2 by means of the simple technique.

Among the above (1) to (4), from the viewpoint of the uniformity of the shell part, the methods of (1) and (2) described above are preferable. In addition, from the viewpoint of ease of the process, the methods of (3) and (4) described above, which further include a step of preparing a mixture containing the base material (gel-forming polymer) and the conductive material in advance before the coating step of the electrode active material, are preferable.

The volume average particle diameter of the core-shell-type electrode material obtained in the above methods of (1) to (4) is preferably 1 to 80 μm. The core-shell-type electrode material having the above volume average particle diameter is one of indices representing that the obtained core-shell-type electrode material is not a mixture of the electrode active material, the gel-forming polymer and the conductive material, but is a particle in which the electrode active material is coated with a coating agent containing the gel-forming polymer and the conductive material.

The volume average particle diameter of the core-shell-type electrode material herein refers to a particle diameter (Dv50) at 50% cumulative value in the particle size distribution obtained by microtrack method (laser diffraction/scattering method). The microtrack method is a method of obtaining a particle size distribution, using scattered light obtained by irradiating particles with a laser beam. For the measurement of the volume average particle diameter, Microtrac manufactured by Nikki Trading Corp. and the like can be used.

Hereinbefore, the specific embodiment of the core-shell-type electrode material contained in the positive electrode active material layer 13 or the negative electrode active material layer 15, which is the characteristic configuration in this embodiment, has been described, but the positive electrode active material layer 13 or the negative electrode active material layer 15 may contain a positive electrode active material or a negative electrode active material other than the aforementioned core-shell-type electrode material (for example, the same material as in the related art). Further, in addition to the positive electrode active material or the negative electrode active material (including the core-shell-type electrode material), the positive electrode active material layer 13 or the negative electrode active material layer 15 may contain a binder, a conductive aid, an ion conductive polymer, a lithium salt, or the like.

Examples of the binder include a solvent-based binder such as polyvinylidene fluoride (PVdF), and an aqueous binder.

The electrode active material layer (particularly, the negative electrode active material layer 15) preferably contains at least an aqueous binder. The aqueous binder has a high binding property. Further, since water as a raw material is easily available and also only water vapor is generated during drying, there is an advantage that the investment on facilities of a production line can be greatly reduced and an environmental load can be reduced. In addition, when an aqueous binder is used as a binder to be contained in the active material layer in the present invention, water is used as a solvent for preparing an active material slurry which is prepared at the time of coating of the active material layer. However, in this case, even when a core-shell-type electrode material is further added to the active material slurry, the risk that a gel-forming material constituting the electrode material is dissolved in water serving as a preparation solvent is small. For this reason, there are also advantages that it is possible to stably use the electrode material and a gel-forming polymer, which may form a physically cross-linked gel can be used in production of the electrode material.

The aqueous binder indicates a binder which has water as a solvent or a dispersion medium, and specific examples thereof include a thermoplastic resin, a polymer with rubber elasticity, a water soluble polymer, and a mixture thereof. Herein, the binder which has water as a dispersion medium includes all expressed as latex or emulsion, and it indicates a polymer emulsified in water or suspended in water. Examples thereof include a polymer latex obtained by emulsion polymerization in a self-emulsifying system.

Specific examples of the aqueous binder include a styrene polymer (styrene-butadiene rubber, a styrene-vinyl acetate copolymer, a styrene-acryl copolymer, or the like), acrylonitrile-butadiene rubber, methyl methacrylate-butadiene rubber, a (meth)acrylic polymer (polyethylacrylate, polyethylmethacrylate, polypropylacrylate, polymethylmethacrylate (methyl methacrylate rubber), polypropylmethacrylate, polyisopropylacrylate, polyisopropylmethacrylate, polybutylacrylate, polybutylmethacrylate, polyhexylacrylate, polyhexylmethacrylate, polyethylhexylacrylate, polyethylhexylmethacrylate, polylaurylacrylate, polylaurylmethacrylate, or the like), polytetrafluoroethylene, polyethylene, polypropylene, an ethylene-propylene copolymer, polybutadiene, butyl rubber, fluororubber, polyethylene oxide, polyepichlorohydrin, polyphosphagen, polyacrylonitrile, polystyrene, an ethylene-propylene-diene copolymer, polyvinylpyridine, chlorosulfonated polyethylene, a polyester resin, a phenol resin, an epoxy resin; polyvinyl alcohol (the average polymerization degree is preferably 200 to 4000, and more preferably 1000 to 3000, and the saponification degree is preferably 80% by mol or more, and more preferably 90% by mol or more) and a modified product thereof (1 to 80% by mol saponified product in a vinyl acetate unit of a copolymer with ethylene/vinyl acetate=2/98 to 30/70 (molar ratio), 1 to 50% by mol partially acetalized product of polyvinyl alcohol, or the like), starch and a modified product thereof (oxidized starch, phosphoric acid esterified starch, cationized starch, or the like), cellulose derivatives (carboxymethyl cellulose, methyl cellulose, hydroxypropyl cellulose, hydroxyethyl cellulose, and salts thereof), polyvinylpyrrolidone, polyacrylic acid (salt), polyethylene glycol, a copolymer of (meth)acrylamide and/or (meth)acrylic acid salt [a (meth)acrylamide polymer, a (meth)acrylamide-(meth)acrylic acid salt copolymer, an alkyl (carbon atom number of 1 to 4) (meth)acrylate-(meth)acrylic acid salt copolymer, or the like], a styrene-maleic acid salt copolymer, a mannich modified product of polyacrylamide, a formalin condensation type resin (a urea-formalin resin, a melamin-formalin resin, or the like), a polyamidepolyamine or dialkylamine-epichlorohydrin copolymer, polyethyleneimine, casein, soybean protein, synthetic protein, and a water soluble polymer such as galactomannan derivatives. These aqueous binders may be used alone or in combination of two or more kinds thereof.

From the viewpoint of a binding property, the aqueous binder preferably contains at least one rubber-based binder selected from the group consisting of styrene-butadiene rubber, acrylonitrile-butadiene rubber, methyl methacrylate-butadiene rubber, and methyl methacrylate rubber. Moreover, from the viewpoint of having a good binding property, the aqueous binder preferably contains styrene-butadiene rubber.

When styrene-butadiene rubber is used as an aqueous binder, the aforementioned water soluble polymer is preferably used in combination from the viewpoint of improving the coating property. Examples of the water soluble polymer which is preferably used in combination with styrene-butadiene rubber include polyvinyl alcohol and a modified product thereof, starch and a modified product thereof, cellulose derivatives (carboxymethyl cellulose, methyl cellulose, hydroxyethyl cellulose, and salts thereof), polyvinylpyrrolidone, polyacrylic acid (salt), and polyethylene glycol. Among them, styrene-butadiene rubber and carboxymethyl cellulose (salt) are preferably combined as a binder. The mass content ratio of the styrene-butadiene rubber to the water soluble polymer is not particularly limited, but the styrene-butadiene rubber:the water soluble polymer is preferably 1:0.1 to 10, and more preferably 1:0.5 to 2.

In a binder used for the negative electrode active material layer, the content of the aqueous binder is preferably 80 to 100% by mass, preferably 90 to 100% by mass, and preferably 100% by mass.

The conductive aid means an additive which is blended in order to enhance the conductivity of the electrode active material layer. Examples of the conductive aid include carbon materials similar to the conductive material described above, such as carbon black including Ketjen black, acetylene black, and the like, graphite, and carbon fiber. When the active material layer contains a conductive aid, an electron network in the inside of the active material layer is effectively formed, and it can contribute to improvement of the output characteristics of a battery.

Examples of the ion conductive polymer include polyethylene oxide (PEO)-based and polypropylene oxide (PPO)-based polymers.

Examples of the electrolyte salt (lithium salt) include $Li(C_2F_5SO_2)_2N$, $LiPF_6$, $LiBF_4$, $LiClO_4$, $LiAsF_6$, and $LiCF_3SO_3$.

A blending ratio of the components that are contained in the negative electrode active material layer 15 and the positive electrode active material layer 13 is not particularly limited. The blending ratio can be adjusted by suitably referring to the already-known knowledge about a lithium ion secondary battery. Also, the thickness of each active material layer is not particularly limited, and reference can be made to the already-known knowledge about a battery. For example, the thickness of each active material layer is about 2 to 100 µm.

(Electrolyte Layer)

The electrolyte to be used in the electrolyte layer 17 of this embodiment is not particularly limited as long as it contains a non-aqueous solvent, and a liquid electrolyte, a gel polymer electrolyte, or an ionic liquid electrolyte is used without limitation.

The liquid electrolyte has a function as a lithium ion carrier. The liquid electrolyte constituting the electrolyte solution layer has the form in which lithium salt is dissolved in an organic solvent that is a non-aqueous solvent. Examples of the organic solvent which can be used include carbonates such as ethylene carbonate (EC), propylene carbonate (PC), dimethyl carbonate (DMC), diethyl carbonate (DEC), ethylmethyl carbonate, and fluoroethylene carbonate, ethers such as tetrahydrofuran, diglyme, and tetraglyme. A liquid electrolyte (electrolyte solution) having a high ion conductivity and a wide potential window is obtained by using these organic solvents, thus a non-electrolyte secondary battery having high output and long lifetime can be obtained. Further, as a lithium salt, $Li(C_2F_5SO_2)_2N$, $LiPF_6$, $LiBF_4$, $LiClO_4$, $LiAsF_6$, $LiCF_3SO_3$, $Li(CF_3SO_2)_2N$, lithium bis(oxalate)borate (LiBOB), $LiN(SO_2F)_2$, and the like can be preferably employed, while it is not particularly limited thereto. A liquid electrolyte (electrolyte solution) having a high ion conductivity and a wide potential window is obtained by using these lithium salts, thus a non-electrolyte secondary battery having high output and long lifetime can be obtained. The liquid electrolyte may further contain an additive in addition to the components described above. Specific examples of such a compound include vinylene carbonate, methylvinylene carbonate, dimethylvinylene carbonate, phenylvinylene carbonate, diphenylvinylene carbonate, ethylvinylene carbonate, diethylvinylene carbonate, vinylethylene carbonate, 1,2-divinylethylene carbonate, 1-methyl-1-vinylethylene carbonate, 1-methyl-2-vinylethylene carbonate, 1-ethyl-1-vinylethylene carbonate, 1-ethyl-2-vinylethylene carbonate, vinylvinylene carbonate, allylethylene carbonate, vinyloxymethylethylene carbonate, allyloxymethylethylene carbonate, acryloxymethylethylene carbonate, methacryloxymethylethylene carbonate, ethynylethylene carbonate, propargylethylene carbonate, ethynyloxymethylethylene carbonate, propargyloxyethylene carbonate, methylene ethylene carbonate, 1,1-dimethyl-2-methylene ethylene carbonate, fluoroethylene carbonate, 1,3-propane sulton, 1,4-butane sulton, 1,3-propene sulton, succinonitrile, adiponitrile, ethylene methanedisulfonate, methylene methanedisulfonate, propylene methanedisulfonate, dimethyl methanedisulfonate, diethyl methanedisulfonate, ethyl methyl methanedisulfonate, and the like. Among them, since the effects of stabilizing the interface between the electrode and the electrolyte and improving battery performance are higher, vinylene carbonate, fluoroethylene carbonate, vinylethylene carbonate, 1,3-propane sulton, 1,4-butane sulton, 1,3-propene sulton, succinonitrile, adiponitrile, ethylene methanedisulfonate, methylene methanedisulfonate, propylene methanedisulfonate, dimethyl methanedisulfonate, diethyl methanedisulfonate, ethyl methyl methanedisulfonate, and the like are preferred, and vinylene carbonate and vinylethylene carbonate are more preferable. These additives may be used alone or in combination of two or more kinds thereof.

The gel polymer electrolyte has a configuration in which the aforementioned liquid electrolyte is injected to a matrix polymer (host polymer) consisting of an ion conductive polymer. Using the gel polymer electrolyte as an electrolyte is excellent in that the fluidity of an electrolyte disappears and ion conductivity between layers is easily blocked. Examples of an ion conductive polymer which is used as a matrix polymer (host polymer) include polyethylene oxide (PEO), polypropylene oxide (PPO), polyethylene glycol (PEG), polyacrylonitrile (PAN), polyvinylidene fluoride-hexafluoropropylene (PVdF-HEP), polymethyl methacrylate (PMMA), and copolymers thereof.

The matrix polymer of a gel polymer electrolyte can exhibit excellent mechanical strength by forming a cross-linked structure. For forming a cross-linked structure, it is sufficient to perform a polymerization treatment of a polymerizable polymer for forming a polymer electrolyte (for example, PEO and PPO), such as thermal polymerization, UV polymerization, radiation polymerization, and electron beam polymerization, by using a suitable polymerization initiator.

The ionic liquid electrolyte is obtained by dissolving a lithium salt in an ionic liquid. Incidentally, the ionic liquid is a salt composed of cation and anion alone, and represents a series of compounds which is liquid at normal temperature.

Regarding the cationic component constituting an ionic liquid, it is preferable to use at least one selected from the group consisting of a substituted or unsubstituted imidazolium ion, a substituted or unsubstituted pyridinium ion, a substituted or unsubstituted pyrrolium ion, a substituted or unsubstituted pyrazolium ion, a substituted or unsubstituted pyrrolinium ion, a substituted or unsubstituted pyrrolidinium ion, a substituted or unsubstituted piperidinium ion, a substituted or unsubstituted triazinium ion, and a substituted or unsubstituted ammonium ion.

Specific examples of the anionic component constituting an ionic liquid include halide ion such as fluoride ion, chloride ion, bromide ion, or iodide ion, nitric acid ion ($NO_3^-$), tetrafluoroborate ion ($BF_4^-$), hexafluorophosphate ion ($PF_6^-$), $(FSO_2)_2N^-$, $AlCl_3^-$, lactic acid ion, acetate ion ($CH_3COO^-$), trifluoroacetate ion ($CF_3COO^-$), methanesulfonate ion ($CH_3SO_3^-$), trifluoromethanesulfonate ion ($CF_3SO_3^-$), bis(trifluoromethanesulfonyl)imide ion ($(CF_3SO_2)_2N^-$), bis(pentafluoroethylsulfonyl)imide ion ($(C_2F_5SO_2)_2N^-$), $BF_2C_2F_5^-$, tris(trifluoromethanesulfonyl) carbon acid ion ($(CF_3SO_2)_3C^-$), perchlorate ion ($ClO_4^-$), dicyanamide ion ($(CN)_2N^-$), organic sulfuric acid ion, organic sulfonic acid ion, $R^1COO^-$, $HOOCR^1COO^-$, $—OOCR^1COO^-$, and $NH_2CHR^1COO^-$ (in this case, $R^1$ is a substituent and represents an aliphatic hydrocarbon group, an alicyclic hydrocarbon group, an aromatic hydrocarbon group, an ether group, an ester group, or an acyl group, and the substituent may include a fluorine atom).

Preferred examples of the ionic liquid include 1-methyl-3-methylimidazolium bis(trifluoromethanesulfonyl)imide, and N-methyl-N-propylpyrrolidinium bis(trifluoromethanesulfonyl)imide. These ionic liquids may be used alone or in combination of two or more kinds thereof.

The lithium salt which is used in the ionic liquid electrolyte is the same lithium salt which is used in the liquid electrolyte described above. Incidentally, the concentration of the lithium salt is preferably 0.1 to 2.0 M, and more preferably 0.8 to 1.2 M.

An additive as described below may be added to the ionic liquid. When an additive is contained, charge/discharge characteristics and cycle characteristics may be further improved at a high rate. Specific examples of the additive include vinylene carbonate, ethylene carbonate, propylene carbonate, γ-butylolactone, γ-valerolactone, methyl diglyme, sulfolane, trimethylphosphate, triethylphosphate, methoxymethyl ethyl carbonate, and fluorinated ethylene carbonate. These may be used alone or in combination of two or more kinds thereof. The use amount when an additive is used is preferably 0.5 to 10% by mass, and more preferably 0.5 to 5% by mass with respect to the ionic liquid.

In the bipolar type secondary battery of this embodiment, a separator may be used in an electrolyte layer. The separator has a function of holding an electrolyte so as to secure the lithium ion conductivity between a positive electrode and a negative electrode and a function of serving as a partition wall between a positive electrode and a negative electrode. In particular, in a case where a liquid electrolyte or an ionic liquid electrolyte is used as an electrolyte, it is preferable to use a separator.

Examples of a separator form include a porous sheet separator or a non-woven separator composed of a polymer or a fiber which absorbs and maintains the electrolyte.

As a porous sheet separator composed of a polymer or a fiber, a microporous (microporous membrane) separator can be used, for example. Specific examples of the porous sheet composed of a polymer or a fiber include a microporous (microporous membrane) separator which is composed of polyolefin such as polyethylene (PE) and polypropylene (PP); a laminate in which a plurality of them are laminated (for example, a laminate with three-layer structure of PP/PE/PP), and a hydrocarbon based resin such as polyimide, aramid, or polyvinylydenefluoride-hexafluoropropylene (PVdF-HFP), or glass fiber.

The thickness of the microporous (microporous membrane) separator cannot be uniformly defined as it varies depending on use of application. For example, for an application in a secondary battery for operating a motor of an electric vehicle (EV), a hybrid electric vehicle (HEV), and a fuel cell vehicle (FCV), it is preferably 4 to 60 μm as a single layer or a multilayer. The fine pore diameter of the microporous (microporous membrane) separator is preferably 1 μm or less at most (in general, the pore diameter is about several tens of nanometers).

As a non-woven separator, conventionally known ones such as cotton, rayon, acetate, nylon, and polyester; polyolefin such as PP and PE; polyimide and aramid are used either singly or as a mixture. Further, the bulk density of the non-woven separator is not particularly limited as long as sufficient battery characteristics are obtained with an impregnated polymer gel electrolyte. Furthermore, it is sufficient that the thickness of the non-woven separator is the same as that of an electrolyte layer, and the thickness thereof is preferably 5 to 200 μm, and particularly preferably 10 to 100 μm.

Further, as a separator, a separator in which a heat resistant insulating layer is laminated on a porous substrate (a separator having a heat resistant insulating layer) is preferable. The heat resistant insulating layer is a ceramic layer containing inorganic particles and a binder. As for the separator having a heat resistant insulating layer, those having high heat resistance, that is, a melting point or a heat softening point of 150° C. or higher, preferably 200° C. or higher, are used. By having a heat resistant insulating layer, internal stress in a separator, which increases under temperature increase, is alleviated so that the effect of inhibiting thermal shrinkage can be obtained. As a result, an occurrence of a short between electrodes of a battery can be prevented so that a battery configuration not easily allowing a performance reduction as caused by temperature increase is yielded. Furthermore, by having a heat resistant insulating layer, mechanical strength of a separator having a heat resistant insulating layer is improved so that the separator hardly has a film breaking. Moreover, because of the effect of inhibiting thermal shrinkage and a high level of mechanical strength, the separator is hardly curled during the process of producing a battery.

The inorganic particles in a heat resistant insulating layer contribute to the mechanical strength or the effect of inhibiting thermal shrinkage of the heat resistant insulating layer. The material used as inorganic particles is not particularly limited. Examples thereof include oxides ($SiO_2$, $Al_2O_3$, $ZrO_2$, $TiO_2$), hydroxides, and nitrides of silicon, aluminum, zirconium, and titanium, and a composite thereof. These inorganic particles may be derived from mineral resources such as boehmite, zeolite, apatite, kaolin, mullite, spinel, olivine, and mica, or artificially synthesized. Furthermore, these inorganic particles may be used alone or in combination of two or more kinds thereof. Among them, from the viewpoint of the cost, it is preferable to use silica ($SiO_2$) or alumina ($Al_2O_3$), and it is more preferable to use alumina ($Al_2O_3$).

The weight per unit area of heat resistant particles is not particularly limited, but is preferably 5 to 15 $g/m^2$. When the weight per unit area is within this range, sufficient ion conductivity is obtained and heat resistant strength is maintained, which is preferable.

The binder in a heat resistant insulating layer has a role of attaching inorganic particles to each other or attaching inorganic particles to a porous resin substrate layer. With this binder, the heat resistant insulating layer is stably formed and peeling between a porous substrate layer and a heat resistant insulating layer is prevented.

The binder used for a heat resistant insulating layer is not particularly limited, and examples thereof which can be used as the binder include compounds such as carboxymethyl cellulose (CMC), polyacrylonitrile, cellulose, an ethylene-vinyl acetate copolymer, polyvinyl chloride, styrene-butadiene rubber (SBR), isoprene rubber, butadiene rubber, polyvinylidene fluoride (PVdF), polytetrafluoroethylene (PTFE), polyvinyl fluoride (PVF), and methyl acrylate. Among these, carboxymethyl cellulose (CMC), methyl acrylate, or polyvinylidene fluoride (PVdF) is preferably used. These compounds may be used alone or in combination of two or more kinds thereof.

The content of the binder in the heat resistant insulating layer is preferably 2 to 20% by mass with respect to 100% by mass of the heat resistant insulating layer. When the content of the binder is 2% by mass or more, the peeling strength between the heat resistant insulating layer and a porous substrate layer can be increased and vibration resistance of a separator can be enhanced. On the other hand, when the content of the binder is 20% by mass or less, a gap between inorganic particles is maintained at an appropriate level so that sufficient lithium ion conductivity can be ensured.

The thermal shrinkage rates of a separator having a heat resistant insulating layer for both MD and TD are 10% or less after maintaining for 1 hour at conditions of 150° C. and 2 $gf/cm^2$. By using a material with such high heat resistance, shrinkage of a separator can be effectively prevented even when the internal temperature of a battery reaches 150° C. due to increased heat generation amount from a positive electrode. As a result, an occurrence of a short between electrodes of a battery can be prevented, and thus a battery configuration not easily allowing performance reduction due to temperature increase is yielded.

<Positive Electrode Current Collecting Plate and Negative Electrode Current Collecting Plate>

The material for forming a current collecting plate (25, 27) is not particularly limited, and a known highly conductive material which has been conventionally used for a current collecting plate for a lithium ion secondary battery can be used. Preferred examples of the material for forming a current collecting plate include metal materials such as aluminum, copper, titanium, nickel, stainless steel (SUS), and an alloy thereof. From the viewpoint of light weightiness, resistance to corrosion, and high conductivity, aluminum and copper are more preferable. Aluminum is particularly preferable. Incidentally, the same material or a different material may be used for the positive electrode current collecting plate 25 and negative electrode current collecting plate 27.

<Positive Electrode Lead and Negative Electrode Lead>

Further, although it is not illustrated, the current collector 11 and the current collecting plate (25, 27) may be electrically connected to each other via a positive electrode lead or a negative electrode lead. The same material used for a lithium ion secondary battery of a related art can be also used as a material for forming the positive and negative electrode leads. Incidentally, a portion led from an outer casing is preferably coated with a heat resistant and insulating thermally shrunken tube or the like so that it has no influence on a product (for example, an automobile component, in particular, an electronic device or the like) according to electric leak after contact with peripheral devices or wirings.

<Sealing Portion>

The sealing portion (insulation layer) has a function of preventing contact between the current collectors adjacent to each other and preventing a short circuit caused at the end portion of the single battery layer. The material constituting the sealing portion may be any materials as long as it has an insulation property, a sealing property (sealing performance) to prevent the solid electrolyte from coming off and prevent permeation of external moisture, heat resistance under battery operation temperature and the like. Examples of the material include an acrylic resin, a urethane resin, an epoxy resin, a polyethylene resin, a polypropylene resin, a polyimide resin, and rubber (ethylene-propylene-diene rubber: EPDM). Alternatively, an isocyanate adhesive, an acrylic resin adhesive, a cyanoacrylate adhesive, or the like may be used, and a hot-melt adhesive (urethane resin, polyamide resin, polyolefin resin) may also be used. Among these, from the viewpoint of corrosion resistance, chemical resistance, ease of production (film-forming performance), economical efficiency, and the like, a polyethylene resin or a polypropylene resin is preferably used as a constituent material of the insulation layer, and a resin containing an amorphous polypropylene resin as a main component and obtained by copolymerizing ethylene, propylene, and butene is preferably used.

<Battery Outer Casing Body>

As a battery outer casing body, an envelope-shaped casing capable of covering a power generating element as illustrated in FIG. 1, in which a laminate film 29 including aluminum is contained, may be used in addition to a known metal can casing. As for the laminate film, a laminate film with a three-layered structure formed by laminating PP, aluminum, and nylon in this order can be used, but is not limited thereto. From the viewpoint of having higher output power and excellent cooling performance, and of being suitably usable for a battery for a large instrument such as an EV or an HEV, a laminate film is desirable. In addition, since the group pressure applied from outside to a power generating element can be easily controlled and thus the thickness of an electrolyte solution layer can be easily controlled to a desired value, an aluminate laminate is more preferred for an outer casing body.

<Method for Producing Non-Aqueous Electrolyte Secondary Battery>

The method for producing a non-aqueous electrolyte secondary battery is not particularly limited, and a non-aqueous electrolyte secondary battery can be produced by a known method. Specifically, the method includes (1) preparation of electrodes, (2) preparation of a single battery layer, (3) preparation of a power generating element, and (4) production of a non-aqueous electrolyte secondary battery. Hereinbelow, the method for producing a non-aqueous electrolyte secondary battery will be described with reference to an example, but is not limited thereto.

(1) Preparation of Electrodes (Positive Electrode and Negative Electrode)

An electrode (positive electrode or negative electrode) can be prepared, for example, by preparing an active material slurry (positive electrode active material slurry or negative electrode active material slurry), and applying the active material slurry to a current collector, drying and then pressing it. The active material slurry contains the active material described above (positive electrode active material or negative electrode active material), and a solvent. Also, a conductive aid and a binder may be further contained.

The solvent is not particularly limited, and N-methyl-2-pyrrolidone (NMP), dimethylformamide, dimethylacetamide, methylformamide, cyclohexane, hexane, water, or the like can be used.

The method for applying an active material slurry to a current collector is not particularly limited, and includes a screen printing method, a spray coating method, an electrostatic spray coating method, an ink jet method, a doctor blade method, and the like.

The method for drying the coating film formed on the surface of the current collector is not particularly limited, and it is sufficient that at least a part of the solvent in the coating film is removed. The drying method includes heating. The drying conditions (drying time, drying temperature, etc.) can be appropriately set, according to the volatilization rate of the solvent contained in the applied active material slurry, the application amount of the active material slurry, and the like, Herein, a part of the solvent may remain. The remained solvent may be removed in the pressing step, and the like.

The press means is not particularly limited, and for example, a calendar roll, a plate press or the like can be used.

(2) Preparation of Single Battery Layer

The single battery layer can be prepared by laminating the electrodes (positive electrode and negative electrode) prepared in (1) via the electrolyte layer.

(3) Preparation of Power Generating Element

The power generating element can be prepared by laminating the single battery layer, suitably considering output and capacity of the single battery layer, output and capacity necessary as a flat laminated battery, and the like.

(4) Production of Non-Aqueous Electrolyte Secondary Battery

In the non-aqueous electrolyte secondary battery, a lead is connected to the current collector of the power generating element obtained above, and the positive electrode lead or negative electrode lead thereof is connected to a positive electrode tab or negative electrode tab. Then, the power generating element is put in a laminated sheet, such that the positive electrode tab and negative electrode tab are exposed to the outside of the battery, and the electrolyte solution is injected by an injector, then the laminated sheet is vacuum-sealed, thereby producing a non-aqueous electrolyte secondary battery.

In the bipolar type secondary battery of this embodiment, when a positive electrode active material layer or a negative electrode active material layer is configured by using the above-described sheet-shaped electrode, the stress caused by expansion and shrinkage of an active material is alleviated even when an active material having a large battery capacity is used, and thus the cycle characteristics of the battery can be improved. Therefore, the bipolar type secondary battery of this embodiment is suitably used as a power source for operating an EV or an HEV.

<Cell Size>

Figure 3:
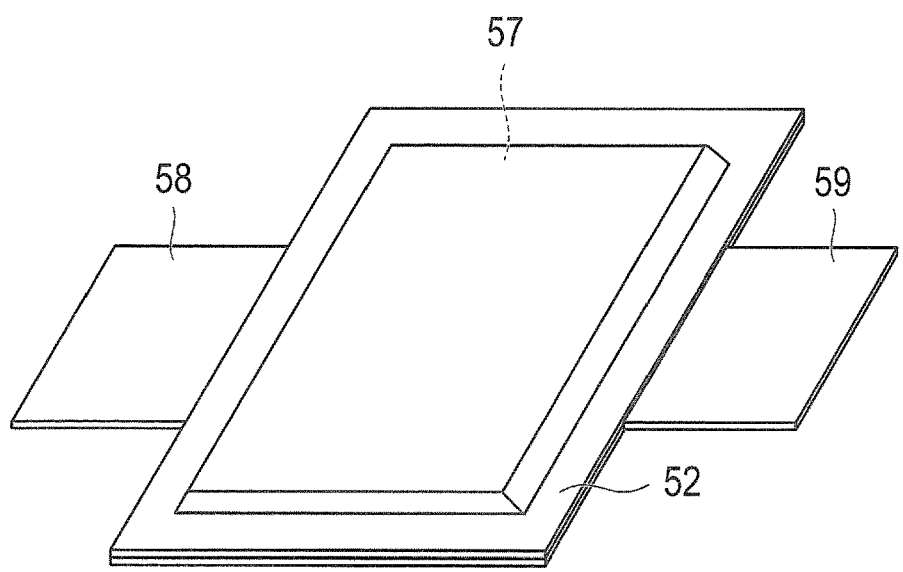
FIG. 3 is a perspective view illustrating the appearance of a flat lithium ion secondary battery as a representative embodiment of a secondary battery.

FIG. 3 is a perspective view illustrating the appearance of a flat lithium ion secondary battery as a representative embodiment of a secondary battery.

As illustrated in FIG. 3, a flat lithium ion secondary battery 50 has a flat and rectangular shape, and from both sides, a positive electrode tab 58 and a negative electrode tab 59 are drawn to extract electric power. A power generating element 57 is covered by a battery outer casing material (laminate film 52) of the lithium ion secondary battery 50 with its periphery fused by heat. The power generating element 57 is sealed in a state in which the positive electrode tab 58 and the negative electrode tab 59 are led to the outside. Herein, the power generating element 57 corresponds to the power generating element 21 of the lithium ion secondary battery 10 illustrated in FIG. 2 as described above. In the power generating element 57, plural single battery layers (single cell) 19, which are each formed of the positive electrode (positive electrode active material layer) 15, the electrolyte layer 17, and the negative electrode (negative electrode active material layer) 13, are laminated.

Incidentally, the lithium ion secondary battery is not limited to a flat shape of laminate type. The winding type lithium ion secondary battery may have a barrel shape or a flat and rectangular shape obtained by modifying the barrel shape, and there is no particular limitation. As an outer casing material of the barrel shape, a laminate film may be used, or a barrel can (metal can) of a related art may be used, and thus there is no particular limitation. Preferably, the power generating element is encased with an aluminum laminate film. The weight reduction may be achieved with such form.

Further, drawing of the tabs 58 and 59 illustrated in FIG. 3 is also not particularly limited. The positive electrode tab 58 and the negative electrode tab 59 may be drawn from the same side or each of the positive electrode tab 58 and the negative electrode tab 59 may be divided into plural tabs and drawn from each side, thus there is no particular limitation on the embodiment illustrated in FIG. 3. In addition, in a winding type lithium ion battery, it is also possible to form a terminal by using, for example, a barrel can (metal can) instead of a tab.

A typical electric vehicle has a battery storage space of about 170 L. Since a cell and an auxiliary machine such as a device for controlling charge and discharge are stored in this space, storage space efficiency of a cell is generally about 50%. The cell loading efficiency for this space is a factor of determining the cruising distance of an electric vehicle. As the size of a single cell decreases, the loading efficiency is lowered, and thus it becomes impossible to maintain the cruising distance.

Therefore, in the present invention, the battery structure of which power generating element is covered with an outer casing body preferably has a large size. Specifically, the length of the short side of a laminate cell battery is preferably 100 mm or more. Such a large-sized battery can be used for an automobile. Herein, the length of the short side of the laminate cell battery indicates the length of the shortest side. The upper limit of the length of the short side is not particularly limited, but is generally 400 mm or less.

<Volume Energy Density and Rated Discharge Capacity>

According to the market requirement, a typical electric vehicle needs to have driving distance (cruising distance) of 100 km per single charge. Considering such a cruising distance, the volume energy density of a battery is preferably 157 Wh/L or more, and the rated capacity is preferably 20 Wh or more.

Further, it is also possible to define the large size of a battery in view of a relation of battery area or battery capacity, from the viewpoint of a large-sized battery, which is different from a physical size of an electrode. For example, in the case of a flat and stack type laminate battery, the problem of having lowered battery characteristics (cycle characteristics), which is caused by the collapse of the crystal structure and the like accompanying expansion and shrinkage of an active material, may occur more easily in a battery having a value of a ratio of the battery area (projected area of a battery including a battery outer casing body) to the rated capacity is 5 $cm^2$/Ah or more and having a rated capacity of 3 Ah or more since the battery area per unit capacity is large. Therefore, the non-aqueous electrolyte secondary battery according to this embodiment is preferably a large-sized battery as described above from the viewpoint of having a larger merit obtained from exhibition of the working effects of the present invention. Furthermore, an aspect ratio of a rectangular electrode is preferably 1 to 3, and more preferably 1 to 2. Incidentally, the aspect ratio of the electrode is defined by the longitudinal/transversal ratio of a positive electrode active material layer with a rectangular shape. When the aspect ratio is set to be in such a range, an advantage of having both performances required for a vehicle and loading space can be obtained.

<Assembled Battery>

An assembled battery is formed by connecting plural batteries. Specifically, at least two of them are used in series, in parallel, or in series and parallel. According to arrangement in series or parallel, it is possible to freely adjust the capacity and voltage.

It is also possible to form a detachable small-size assembled battery by connecting plural batteries in series or in parallel. Further, by connecting again plural detachable small-size assembled batteries in series or parallel, an assembled battery having high capacity and high output, which is suitable for a power source or an auxiliary power source for operating a vehicle requiring a high volume energy density and a high volume output density, can be formed. The number of the connected batteries for producing an assembled battery or the number of the stacks of a small-size assembled battery for producing an assembled battery with high capacity may be determined depending on the capacity or output of a battery of a vehicle (electric vehicle) on which the battery is mounted.

<Vehicle>

The non-aqueous electrolyte secondary battery of the present invention can maintain discharge capacity even when it is used for a long period of time, and thus has good cycle characteristics. Further, the non-aqueous electrolyte secondary battery has a high volume energy density. For use in a vehicle such as an electric vehicle, a hybrid electric vehicle, a fuel cell electric vehicle, or a hybrid fuel cell electric vehicle, a long service life is required as well as high capacity and large size compared to use for an electric and mobile electronic device. Therefore, the non-aqueous electrolyte secondary battery described above can be preferably used as a power source for a vehicle, for example, as a power source for operating a vehicle or as an auxiliary power source for operating a vehicle.

Specifically, the battery or an assembled battery formed by combining plural batteries can be mounted on a vehicle. According to the present invention, a battery with excellent long term reliability and output characteristics, and a long service life can be formed, and thus, by mounting this battery, a plug-in hybrid electric vehicle with a long EV driving distance and an electric vehicle with a long driving distance per charge can be achieved. This is because, when the battery or an assembled battery formed by combining plural batteries is used for, for example, a vehicle such as a hybrid car, a fuel cell electric car, and an electric car (including a two-wheel vehicle (motor bike) or a three-wheel vehicle in addition to all four-wheel vehicles (an automobile, a truck, a commercial vehicle such as a bus, a compact car, or the like)), a vehicle with a long service life and high reliability can be provided. However, the use is not limited to a vehicle, and it can be applied to various power sources of other transportation means, for example, a moving object such as an electric train, and it can be also used as a power source for loading such as an uninterruptable power source device.

Hereinbelow, it will be described in detail using examples and comparative examples, but the present invention is not limited only to the following examples. Unless otherwise noted, part(s) means part(s) by mass, and % means % by mass.

Production Example 1

Synthesis of Gel-Forming Polymer (Vinyl Resin (A))

To a four-necked flask equipped with a stirrer, a thermometer, a reflux cooling tube, a dropping funnel, and a nitrogen gas introducing tube, 83 parts by mass of ethyl acetate and 17 parts by mass of methanol were charged, and the temperature was raised to 68° C. Subsequently, a monomer blend solution obtained by blending 242.8 parts by mass of a methacrylic acid, 97.1 parts by mass of methyl methacrylate, 242.8 parts by mass of 2-ethylhexyl methacrylate, 52.1 parts by mass of ethyl acetate and 10.7 parts by mass of methanol, and an initiator solution obtained by dissolving 0.263 parts by mass of 2,2'-azobis(2,4-dimethylvaleronitrile) in 34.2 parts by mass of ethyl acetate were continuously added dropwise to the four-necked flask with a dropping funnel while blowing nitrogen thereinto, under stirring, over 4 hours, to perform radical polymerization. After completion of dropwise addition, an initiator solution obtained by dissolving 0.583 parts by mass of 2,2'-azobis (2,4-dimethylvaleronitrile) in 26 parts by mass of ethyl acetate was continuously added using a dropping funnel over 2 hours. Furthermore, polymerization was continued at a boiling point for 4 hours. The solvent was removed, and 582 parts by mass of a resin was obtained, then 1,360 parts by mass of isopropanol was added to obtain a vinyl resin (A) solution with a resin concentration of 30% by mass.

Production Example 2

Synthesis of Gel-Forming Polymer (Vinyl Resin (B))

The feed composition of the monomer contained in the monomer blend solution was changed to 242.8 parts by mass of a methacrylic acid, and 333.9 parts by mass of N-vinyl- 2-pyrrolidone, to obtain a vinyl resin (B) solution, using the same resin production method as in Production Example 1.

Production Example 3

Synthesis of Gel-Forming Polymer (Vinyl Resin (C))

The feed composition of the monomer contained in the monomer blend solution was changed to 48.6 parts by mass of a methacrylic acid, 48.6 parts by mass of 2-ethylhexyl methacrylate, and 48.6 parts by mass of 2-hydroxyethyl methacrylate, to obtain a vinyl resin (C) solution, using the same resin production method as in Production Example 1.

Production Example 4

Synthesis of Gel-Forming Polymer (Vinyl Resin (D))

The feed composition of the monomer contained in the monomer blend solution was changed to 48.6 parts by mass of a methacrylic acid, 97.1 parts by mass of methyl methacrylate, and 97.1 parts by mass of 2-ethylhexyl methacrylate, to obtain a vinyl resin (D) solution, using the same resin production method as in Production Example 1.

[Measurement of Liquid Absorption Rate with Respect to Electrolyte Solution of Gel-Forming Polymer]

The liquid absorption rate with respect to the electrolyte solution of the gel-forming polymer is obtained by the following equation, measuring the weights of the gel-forming polymer before immersing in the electrolyte solution and after immersing in the electrolyte solution.

Liquid absorption rate (%)=[(Weight of gel-forming polymer after immersing in electrolyte solution−Weight of gel-forming polymer before immersing in electrolyte solution)/Weight of gel-forming polymer before immersing in electrolyte solution]×100    [Equation 1]

Each of the solutions of the vinyl resins (A) to (D) obtained in the Production Examples 1 to 4 was cast on a PET film and dried to form a sheet-shaped film having a thickness of 500 μm, then punched in a dumbbell form, and used as a sample.

As an electrolyte solution for obtaining the liquid absorption rate, one obtained by dissolving $LiPF_6$ as a lithium salt in a solution of ethylene carbonate (EC) and diethyl carbonate (DEC) mixed at a volume ratio of EC:DEC=3:7, so as to have a concentration of 1 mol/L, was used.

The film was immersed in an electrolyte solution at 50° C. for 3 days. By the immersion at 50° C. for 3 days, the gel-forming polymer becomes a saturated liquid absorption state. Herein, the saturated liquid absorption state refers to a state that the weight of the polymer does not increase even when immersed in the electrolyte solution any more.

The values of the liquid absorption rate with respect to the electrolyte solution of the vinyl resins (A) to (D) obtained as described above are shown in Table 1 below.

Example 1

Preparation of Electrode Material for Non-Aqueous Electrolyte Secondary Battery 90 parts by mass of hard carbon powder [manufactured by Kureha Battery Materials Japan Co., Ltd.] (average particle diameter of 10 μm) as a negative electrode active material was charged to a universal mixer, and 15 parts by mass (5 parts by mass of the resin solid content) of the vinyl resin (A) solution obtained in Production Example 1 was added dropwise and mixed over 60 minutes while stirring at 150 rpm at room temperature, and the mixture was further stirred for 30 minutes.

Subsequently, 5 parts by mass of acetylene black [manufactured by Denka Company Limited.] as a conductive material was mixed in three times while stirring, and the temperature was raised to 70° C. while keeping stirring for 30 minutes, then the pressure was reduced to 0.01 MPa, and held for 30 minutes. Core-shell-type electrode material 1 was obtained by the above operations.

Scanning electron microscope (SEM) photographs ((a) magnification of 1,000 times, (b) magnification of 5,000 times) of the core-shell-type electrode material 1 obtained as described above are shown in FIG. 4. It was confirmed by SEM observation that the active material surface was coated with the gel-forming polymer.

Preparation of Test Electrode (Negative Electrode)

95 parts by mass of the core-shell-type electrode material 1 obtained in Production Example 1, 2 parts by mass of acetylene black as a conductive aid, 2.5 parts by mass of carboxymethyl cellulose (CMC) sodium salt (manufactured by DKS Co. Ltd., CELLOGEN F-BSH4) as a binder, and 6.25 parts by mass of styrene-butadiene rubber (SBR) (manufactured by JSR Corporation, resin concentration of 40% by mass) as a binder were mixed. Subsequently, 30 parts by mass of water as a solvent for controlling slurry viscosity was added thereto, and was sufficiently mixed with a planetary mill, thereby obtaining a negative electrode active material slurry.

Meanwhile, a copper foil (thickness: 20 μm) was prepared as a negative electrode current collector. Further, the negative electrode active material slurry prepared above was applied to one surface of the negative electrode current collector such that the amount of the active material applied became 10 mg/cm² to form a coating film. Subsequently, this coating film was dried at normal pressure at 80° C. for 3 hours, then dried under vacuum at 80° C. for 8 hours to evaporate the solvent. Thereafter, the obtained negative electrode was punched using a punch to have a circle shape of φ17 mm, thereby obtaining a test electrode (negative electrode).

[Evaluation of Battery]

A negative electrode half cell using the above test electrode (negative electrode) was prepared, using the HS cell manufactured by Hohsen Corp. as an evaluation cell. As a counter electrode, a lithium metal foil manufactured by Honjo Metal Co., Ltd. that was punched into φ19 mm was used. As a separator, a sheet of polypropylene microporous film (Celgard 2500, manufactured by Polypore K.K.) that was punched into φ23 mm was used. The negative electrode, the separator, and the lithium metal were arranged in the HS cell, then an electrolyte solution was sufficiently added to form a negative electrode half cell. As the electrolyte solution, a solution obtained by dissolving $LiPF_6$ in a mixed solvent of EC/DEC (volume ratio of 1:1) at a 1 M concentration was used. Using charge and discharge tester SM8 manufactured by HOKUTO DENKO CORP for the evaluation of battery, the charging and discharging pattern of CCCV charging to 0 V at 0.1 C rate for 15 hours, then discharging to 2.5 V at 0.1 C was performed, and the ratio of the discharge electric quantity to the charge electric quantity was defined as an initial coulomb efficiency.

Example 2

The same procedures were carried out as in Example 1, except for using the vinyl resin (B) prepared in Production Example 2, in place of the vinyl resin (A), as the gel-forming polymer, in the preparation step of the electrode material for a non-aqueous electrolyte secondary battery, to prepare a battery, and the evaluation was performed.

Example 3

The same procedures were carried out as in Example 1, except for using the vinyl resin (C) prepared in Production Example 3, in place of the vinyl resin (A), as the gel-forming polymer, in the preparation step of the electrode material for a non-aqueous electrolyte secondary battery, to prepare a battery, and the evaluation was performed.

Example 4

The same procedures were carried out as in Example 1, except for using 90 parts by mass of hard carbon powder, 1 part by mass of the vinyl resin (A) (resin solid content) and 9 parts by mass of acetylene black, in the preparation step of the electrode material for a non-aqueous electrolyte secondary battery, to prepare a battery, and the evaluation was performed.

Comparative Example 1

The same procedures were carried out as in Example 1, except for using the vinyl resin (D) prepared in Production Example 4, in place of the vinyl resin (A), as the gel-forming polymer, in the preparation step of the electrode material for a non-aqueous electrolyte secondary battery, to prepare a battery, and the evaluation was performed.

Comparative Example 2

The same procedures were carried out as in Example 1, except for using 90 parts by mass of hard carbon powder, 10 parts by mass of the vinyl resin (A) (resin solid content) and 0 part by mass of acetylene black, in the preparation step of the electrode material for a non-aqueous electrolyte secondary battery, to prepare a battery, and the evaluation was performed.

The evaluation results of initial coulomb efficiencies of the batteries obtained in each of examples and comparative examples are shown in Table 1 and FIG. 5 below.

TABLE 1

|  | Gel-forming polymer | Liquid absorption rate with respect to electrolyte solution (%) | Coating composition (Mass ratio) Active material:Resin:Conductive material | Initial coulomb efficiency (%) |
| --- | --- | --- | --- | --- |
| Example 1 | Vinyl resin (A) | 41 | 90:5:5 | 81.4 |
| Example 2 | Vinyl resin (B) | 25 | 90:5:5 | 83.4 |
| Example 3 | Vinyl resin (C) | 72 | 90:5:5 | 80.5 |
| Example 4 | Vinyl resin (A) | 41 | 90:1:9 | 80.2 |
| Comparative Example 1 | Vinyl resin (D) | 289 | 90:5:5 | 76.4 |
| Comparative Example 2 | Vinyl resin (A) | 41 | 90:10:0 | Battery not operated |

Figure 5:
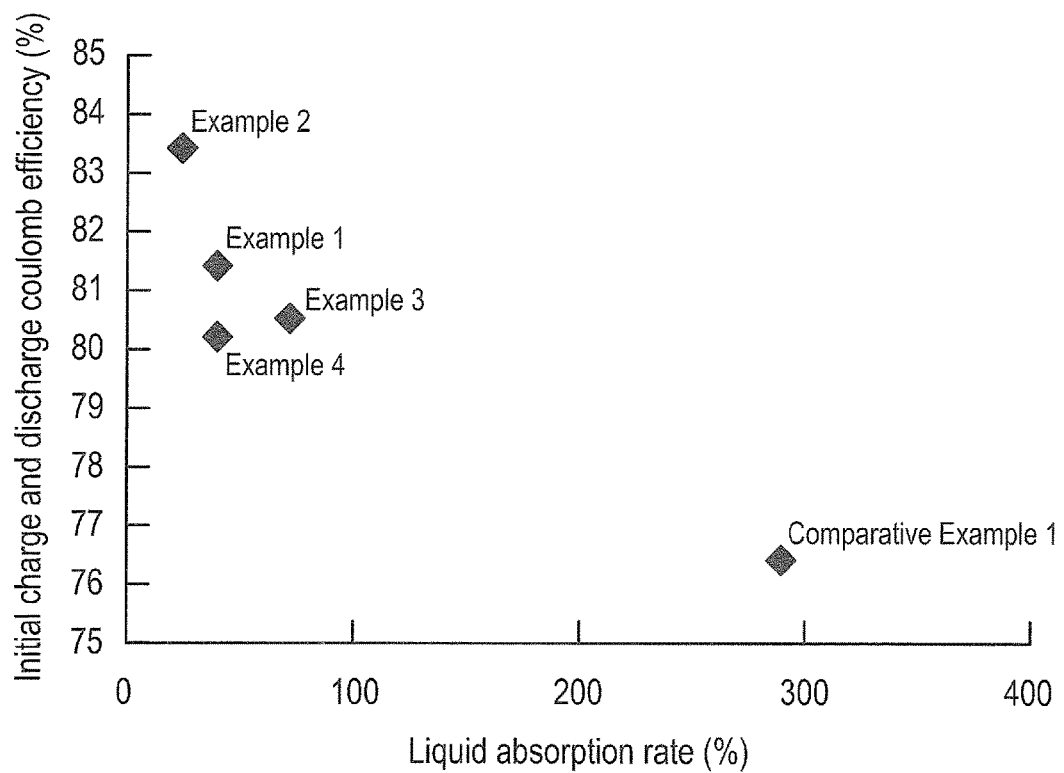
FIG. 5 is a graph showing relationship between the liquid absorption rate with respect to the electrolyte solution of the gel-forming polymer used in the core-shell-type electrode material of batteries of examples and comparative examples and the initial coulomb efficiency of the batteries.

Based on the results of Table 1 and FIG. 5, it was found that a battery using an electrode material in which the electrode active material that is a core part is coated with a shell part in which a gel-forming polymer having a liquid absorption rate with respect to the electrolyte solution of 10 to 200% and a conductive material are included improves the initial coulomb efficiency.

The invention claimed is:

1. A non-aqueous electrolyte secondary battery comprising a positive electrode having a positive electrode active material layer, a negative electrode having a negative electrode active material layer, and an electrolyte layer having an electrolyte solution containing a non-aqueous solvent,
    wherein at least one of the positive electrode active material layer and the negative electrode active material layer comprises:
        a core-shell-type electrode material having a particle form in which a core part including an electrode active material is coated with a shell part including a coating agent having a conductive material and a gel-forming polymer in a gel state and having a liquid absorption rate with respect to absorption of the electrolyte solution of 25 to 200%, wherein the liquid absorption rate of the gel-forming polymer with respect to the electrolyte solution is determined with the following equation:

Liquid absorption rate (%)=[(Weight of gel-forming polymer after immersing in electrolyte solution−Weight of gel-forming polymer before immersing in electrolyte solution)/Weight of gel-forming polymer before immersing in electrolyte solution]×100; and a binder containing styrene-butadiene rubber and carboxymethyl cellulose wherein the binder is dispersed in at least one of the positive electrode active material layer or the negative electrode active material layer.

2. The non-aqueous electrolyte secondary battery according to claim 1, wherein the conductive material is a carbon material.

3. The non-aqueous electrolyte secondary battery according to claim 1, wherein a mixing ratio of the gel-forming polymer of the shell part and the conductive material (gel-forming polymer: conductive material) by mass ratio is 8:2 to 2:8.

4. The non-aqueous electrolyte secondary battery according to claim 1, wherein the gel-forming polymer is a vinyl resin having a vinyl monomer as an essential constituent monomer.

5. The non-aqueous electrolyte secondary battery according to claim 4, wherein the vinyl resin comprises a vinyl monomer (a1) having a carboxyl group and a vinyl monomer (a2) represented by General Formula (1) below, as vinyl monomers,

[Chemical Formula 1]

$$CH_2\!=\!C(R^1)COOR^2 \qquad (1)$$

wherein $R^1$ is a hydrogen atom or a methyl group, and $R^2$ is a branched alkyl group having 4 to 36 carbon atoms.

6. The non-aqueous electrolyte secondary battery according to claim 1, which is a bipolar type lithium ion secondary battery.

7. The non-aqueous electrolyte secondary battery according to claim 5, wherein the vinyl resin further comprises a hydroxyalkyl acrylate (a4), as a vinyl monomer.

8. The non-aqueous electrolyte secondary battery according to claim 4, wherein the vinyl resin is a polymer comprising the vinyl monomer (a1) having a carboxyl group and a nitrogen-containing vinyl compound (a33), as constituent monomers, and the nitrogen-containing vinyl compound (a33) is an amide group-containing vinyl compound (a33-1); a (meth)acrylate compound (a33-2) selected from the group consisting of dialkyl (1 to 4 carbon atoms) aminoalkyl (1 to 4 carbon atoms) (meth)acrylates and quaternary ammonium group-containing (meth)acrylates; a heterocyclic ring-containing vinyl compound (a33-3); or a nitro group-containing vinyl compound.

9. The non-aqueous electrolyte secondary battery according to claim 8, wherein the vinyl resin comprises methacrylic acid and N-vinyl-2-pyrrolidone, as constituent monomers.

10. A method for producing the non-aqueous electrolyte secondary battery of claim 1, wherein the core-shell-type electrode material is obtained by any method of the following (1) to (4):

(1) a method which comprises charging a resin solution containing the gel-forming polymer while stirring, in the presence of the electrode active material, adding the conductive material thereto, and removing a solvent therefrom while stirring;

(2) a method which comprises dissolving the gel-forming polymer in a good solvent thereof, dispersing a powder of the electrode active material in the solution, and adding a poor solvent of the gel-forming polymer to the solution;

(3) a method which comprises dissolving the gel-forming polymer in a good solvent thereof, and spraying the obtained solution on the surface of the electrode active material; and (4) a method which comprises dissolving the electrode active material, the conductive material and the gel-forming polymer in a good solvent of the gel-forming polymer, and pulverizing a solid content obtained by drying the solution.

* * * * *